(12) United States Patent
Sueyoshi et al.

(10) Patent No.: US 7,693,413 B2
(45) Date of Patent: Apr. 6, 2010

(54) CAMERA SYSTEM, INFORMATION PROCESSING DEVICE, INFORMATION PROCESSING METHOD, AND COMPUTER PROGRAM

(75) Inventors: Takahiko Sueyoshi, Tokyo (JP); Michimune Kohno, Tokyo (JP); Yuji Ayatsuka, Tokyo (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 11/486,129

(22) Filed: Jul. 14, 2006

(65) Prior Publication Data
US 2007/0019943 A1    Jan. 25, 2007

(30) Foreign Application Priority Data
Jul. 21, 2005    (JP)    ............................. 2005-211919

(51) Int. Cl.
*G03B 41/00* (2006.01)
(52) U.S. Cl. ...................................................... 396/333
(58) Field of Classification Search ................. 396/333, 396/334
See application file for complete search history.

(56) References Cited

U.S. PATENT DOCUMENTS

| | | | | | |
|---|---|---|---|---|---|
| 6,052,539 | A | * | 4/2000 | Latorre | 396/263 |
| 7,502,496 | B2 | * | 3/2009 | Kozakaya et al. | 382/118 |
| 2002/0145660 | A1 | * | 10/2002 | Kanade et al. | 348/36 |
| 2002/0176610 | A1 | * | 11/2002 | Okazaki et al. | 382/118 |
| 2005/0024496 | A1 | * | 2/2005 | Hiroto et al. | 348/159 |
| 2006/0055792 | A1 | * | 3/2006 | Otsuka et al. | 348/211.4 |
| 2006/0165405 | A1 | * | 7/2006 | Kanai et al. | 396/334 |
| 2007/0053679 | A1 | * | 3/2007 | Beniyama et al. | 396/325 |
| 2007/0242945 | A1 | * | 10/2007 | Fredlund et al. | 396/310 |
| 2007/0285575 | A1 | * | 12/2007 | Gloudemans et al. | 348/587 |

FOREIGN PATENT DOCUMENTS

| | | |
|---|---|---|
| JP | 2002-077592 | 3/2002 |
| JP | 2002-191044 | 7/2002 |
| JP | 2004-046591 | 2/2004 |
| JP | 2004-173083 | 6/2004 |
| JP | 2004-186922 | 7/2004 |
| JP | 2005-020446 | 1/2005 |
| JP | 2005-056175 | 3/2005 |
| JP | 2005-151375 | 6/2005 |

* cited by examiner

*Primary Examiner*—W. B. Perkey
(74) *Attorney, Agent, or Firm*—Finnegan, Henderson, Farabow, Garrett & Dunner, L.L.P.

(57) ABSTRACT

A camera system has: cameras; and an information-processing device connected through a communication network with the cameras, which acquires a shot image from the cameras. Each camera includes: an image-pickup part taking an image of a subject; and an image-pickup synchronizing part mutually synchronizing an image-pickup timing of the camera with an image-pickup timing of another camera. The information-processing device includes: a synchronous shot image-acquiring part acquiring shot images taken by the cameras at a common timing from the cameras; an image-evaluating part evaluating the condition of the subject in the shot image for each of the shot images taken at a common timing acquired by the synchronous shot image-acquiring part based on predetermined evaluation criteria to assign an evaluation value to each shot image; a prioritizing part assigning a priority to each shot image according to the evaluation value assigned to each shot image by the image-evaluating part; and a display control part making a display device display the shot images according to priorities assigned to the shot images by the prioritizing part.

18 Claims, 16 Drawing Sheets

FIG. 10A

| | | SHOT IMAGE A | SHOT IMAGE B | SHOT IMAGE C | POINT |
|---|---|---|---|---|---|
| NUMBER OF DETECTED FACES | | 5 | 7 | 2 | 1 |
| FACE ANGLE | (FULL FACE) | 3 | 4 | 0 | 5 |
| | (SIDE FACE) | 2 | 3 | 2 | 3 |
| FACE SIZE | (LARGE) | 2 | 5 | 0 | 5 |
| | (MIDDLE) | 2 | 2 | 2 | 3 |
| | (SMALL) | 1 | 0 | 0 | 1 |
| FACE POSITION | (CENTER) | 2 | 4 | 0 | 5 |
| | (UPPER) | 1 | 0 | 0 | 2 |
| | (LOWER) | 2 | 2 | 2 | 2 |
| | (LEFT) | 0 | 1 | 0 | 2 |
| | (RIGHT) | 0 | 1 | 0 | 2 |

FIG. 10B

A = (5 × 1) + (3 × 5) + (2 × 3) + (2 × 5) + (2 × 3) + (1 × 1) + (2 × 5) + (3 × 2) = 59 POINTS

B = (7 × 1) + (4 × 5) + (3 × 3) + (5 × 5) + (2 × 3) + (4 × 5) + (3 × 2) = 129 POINTS

C = (2 × 1) + (2 × 3) + (2 × 3) + (2 × 2) = 18 POINTS

FIG. 13A

|  | SHOT IMAGE A | | SHOT IMAGE A | |
| --- | --- | --- | --- | --- |
|  | REGISTERED USER X | REGISTERED USER Y | REGISTERED USER X | REGISTERED USER Y |
| 408 — FACE ANGLE | POSTURE L4 | POSTURE L11 | POSTURE L4 | POSTURE L15 |
| 410 — FACE SIZE | MIDDLE | LARGE | MIDDLE | LARGE |
| 412 — FACE POSITION | CENTER | LEFT | RIGHT | CENTER |

FIG. 13B

| 414 — POSTURE | L4 | L5 | L6 | L7 | L8 | L10 | L11 | L12 | L14 | L15 | L16 |
| --- | --- | --- | --- | --- | --- | --- | --- | --- | --- | --- | --- |
| 416 — POINT | 7 | 5 | 5 | 4 | 4 | 2 | 1 | 1 | 2 | 1 | 1 |

FIG. 13C

| 418 — FACE SIZE | LARGE | MIDDLE | SMALL |
| --- | --- | --- | --- |
| 416 — POINT | 5 | 3 | 1 |

FIG. 13D

| 420 — FACE POSITION | CENTER | UPPER | LOWER | RIGHT | LEFT |
| --- | --- | --- | --- | --- | --- |
| 416 — POINT | 5 | 2 | | | |

FIG. 13E

| USER X | A = 7 + 3 + 5 = 15 POINT | — 421 |
| --- | --- | --- |
|  | B = 2 + 3 + 2 = 7 POINT | — 422 |
| USER Y | A = 1 + 5 + 2 = 8 POINT | — 424 |
|  | B = 1 + 5 + 5 = 11 POINT | — 426 |

CAMERA SYSTEM, INFORMATION PROCESSING DEVICE, INFORMATION PROCESSING METHOD, AND COMPUTER PROGRAM

CROSS REFERENCES TO RELATED APPLICATIONS

The present invention contains subject matter related to Japanese Patent Application JP 2005-211919 filed in the Japanese Patent Office on Jul. 21, 2005, the entire contents of which being incorporated herein by reference.

BACKGROUND OF THE INVENTION

1. Field of the Invention

The present invention relates to a camera system, an information-processing device, an information processing method, and a computer program. More specifically, it relates to a camera system for performing a process on shot images taken at a common timing by two or more cameras, an information-processing device, an information processing method, and a computer program.

2. Related Art

In the case where a subject is photographed by a camera, two or more cameras are often used to take two or more images of the subject at a common timing. Specifically, the two or more cameras are disposed at different angles and different distances from the subject, and images of the same subject are taken from the respective places. As a result, two or more shot images of the same subject can be obtained, which are different from each other in the angle of the subject, the size of the subject in a photographed image, and the like.

There are various conceivable methods as the method of using images, which are obtained when the same subject is photographed by two or more cameras at a common timing. For example, with the method of wide-range photography disclosed in JP-A-2004-186922, photographic images of the same subject obtained when the subject is photographed by two or more cameras are coupled with their overlapping portion cut out, whereby a wide-range photographic image is produced.

SUMMARY OF THE INVENTION

Taking an image of the same subject by two or more cameras at a common timing can produce the difference in the condition under which the subject comes out in the image between photographed images taken by the cameras depending on the position of each camera and the situation at the time when the image is taken. When a user obtains shot images taken by the cameras and selects a shot image in which the subject comes out under a good condition, the user needs to manually compare the shot images to select a shot image of a good condition at present. Therefore, in the case where there are many shot images, it can be enormous efforts for the user to manually compare shot images and selects one.

Considering the problems, it is desirable to provide a camera system, an information-processing device, an information processing method, and a computer program, by which it is made possible that when an image of the same subject is taken by two or more cameras at a common timing, a shot image in which the subject comes out under a good condition is selected from the resultant shot images and shown to a user, automatically.

According to an aspect of the invention, provided is a camera system, having: a plurality of cameras; an information-processing device, which is connected through a communication network with the plurality of cameras, and which acquires a shot image from the plurality of cameras, wherein the plurality of cameras each includes an image-pickup part operable to take an image of a subject, and an image-pickup synchronizing part operable to mutually synchronize an image-pickup timing of the camera with an image-pickup timing of another one of the cameras, and wherein the information-processing device includes a synchronous shot image-acquiring part operable to acquire a shot image taken by each of the cameras at a common timing from the cameras, an image-evaluating part operable to evaluate a condition of the subject in each shot image concerning each of the shot images taken at a common timing acquired by the synchronous shot image-acquiring part based on predetermined evaluation criteria and to assign an evaluation value to each shot image, a prioritizing part operable to assign a priority to each of the shot images according to the evaluation value assigned to each shot image by the image-evaluating part, and a display control part operable to make a display device display the shot images according to the priorities assigned to the shot images by the evaluating part.

According to another aspect of the invention, provided is an information-processing device, which is connected through a communication network with a plurality of cameras each operable to synchronize an image pickup timing thereof with an image-pickup timing of another one of the cameras and take an image of a subject, and which acquires a shot image from each of the cameras, having: a synchronous shot image-acquiring part operable to acquire a shot image taken by each of the cameras at a common timing from the cameras; an image-evaluating part operable to evaluate a condition of the subject in each shot image concerning each of the shot images taken at a common timing acquired by the synchronous shot image-acquiring part based on predetermined evaluation criteria and to assign an evaluation value to each shot image; a prioritizing part operable to assign a priority to each of the shot images according to the evaluation value assigned to each shot image by the image-evaluating part; and a display control part operable to make a display device display the shot images according to the priorities assigned to the shot images by the evaluating part. The condition of the subject in the shot image includes various kinds of factors relating to what condition the subject in the shot image comes out in, e.g. the size of the subject with respect to the whole shot image, the angle of the subject, the position of the subject in the shot image, the degree of blurring of the subject, the degree of shake of the subject caused by camera shake at the time of image pickup, and brilliance of the subject stemming from the brightness of the circumference at the time of image pickup.

The image-evaluating part may detect a face image of a person from each of the shot images, and determine the evaluation value of each of the shot images based on a condition of the detected face image.

The image-evaluating part may determine the evaluation value based on a face angle of the detected face image. In this case, the prioritizing part may assign a higher priority to the shot image including an image of a fullface of the person in comparison to the shot image including a face of an angle other than the fullface of the person based on the evaluation value. The fullface refers to the face of a person in a shot image when the face of the person is photographed right in the face of the person. The fullface may include person's face directed right in front, and faces directed up, down, right, and left within a predetermined angle.

The image-evaluating part may determine the evaluation value based on a size of the detected face image. In this case, the prioritizing part may assign, based on the evaluation value, a higher priority to the shot image whose face image has a size of a predetermined value or larger in comparison to the shot image whose face image has a size below the predetermined value.

The image-evaluating part may determine the evaluation value based on locational information on the detected face image in the shot image. In this case, the prioritizing part may assign, based on the evaluation value, a higher priority to the shot image whose face image is located at a distance shorter than a predetermined distance from a center of the shot image in comparison to the shot image whose face image is located at a distance longer than the predetermined distance from the center of the shot image.

The image-evaluating part may determine the evaluation value based on a number of face images detected from the shot image. In this case, the higher priority the prioritizing part may assign based on the evaluation value, the larger the number of detected face images is.

The image-evaluating part may determine the evaluation value based on a number of face images detected from each shot image, and a face angle of the detected face image. In this case, the higher priority the prioritizing part may assign based on the evaluation value, the larger the number of the detected fullface images is.

The information-processing device may further include a face-recognizing part operable to identify a person appropriate for the face image based on the detected face image. In this case, the image-evaluating part may determine the evaluation value of each shot image based on a condition of the face image of the person identified by the face-recognizing part. According to such arrangement, a shot image can be assigned a priority based on the condition of a face image of a certain person in the shot image.

The information-processing device may further include: a face-recognizing part operable to identify a person appropriate for the face image based on the detected face image; and a personage-memorizing part operable to associate and memorize information of the person identified by the face-recognizing part from at least one of the shot images acquired by the synchronous shot image-acquiring part with all the shot images.

The information-processing device may further include a locational information-acquiring part operable to acquire image pickup locational information showing a position of each camera at the time of image pickup of the subject from the cameras.

The information-processing device may further include an image pickup bearing-acquiring part operable to acquire image pickup bearing information showing an image pickup bearing of each camera at the time of image pickup of the subject from the camera.

The information-processing device may further include an image pickup angle-acquiring part operable to acquire image pickup angle information showing a tilt angle of each camera at the time of image pickup of the subject from the camera.

The display control part may force the display device to display the shot images in turn in a priority order of the shot images.

The display control part may force the display device to display the shot images in a priority order of the shot images with their image size changed.

According to another aspect of the invention, provided is a computer program which forces a computer to serve as the information-processing device. The computer program is stored in a storage part that a computer has. When the computer program is read in CPU of the computer and executed, the program forces the computer to work as the above-described information-processing device. Also, a computer-readable recording medium in which the computer program is recorded is provided. The recording medium may be, for example, a magnetic disk or an optical disk.

According to another aspect of the invention, provided is an information processing method executed by an information-processing device, which is connected through a communication network with a plurality of cameras each operable to synchronize an image pickup timing thereof with an image-pickup timing of another one of the cameras and take an image of a subject, and which acquires a shot image from each of the cameras, including: a synchronous shot image-acquiring step of acquiring shot images taken by the plurality of cameras at a common timing from the cameras; an image evaluating step of evaluating a condition of the subject in each shot image concerning each of the shot images taken at a common timing acquired in the synchronous shot image-acquiring step based on predetermined evaluation criteria and assigning an evaluation value to each shot image; a prioritizing step of assigning a priority to each of the shot images according to the evaluation value assigned to each shot image in the image evaluating step; and a display control step of making a display device display the shot images according to the priorities assigned to the shot images in the prioritizing step.

According to another aspect of the invention, provided is a camera, which is connected through a communication network with an information-processing device operable to make a display device display an image, and which sends a shot image to the information-processing device, having: an image-pickup part operable to take an image of a subject; an image-pickup synchronizing part operable to synchronize an image-pickup timing of the camera with an image-pickup timing of another one of the cameras; an image-evaluating part operable to evaluate a condition of the subject in the shot image concerning the shot image taken by the image-pickup part based on predetermined evaluation criteria and to assign an evaluation value to each shot image; and a shot image sending part operable to associate and send the shot image with the evaluation value to the information-processing device.

The image-evaluating part of the camera may detect a face image of a person from the shot image, and determines the evaluation value of the shot image based on a condition of the detected face image.

Further, according to another aspect of the invention, provided is an information-processing device which is connected through a communication network with a plurality of cameras each operable to synchronize an image pickup timing thereof with an image-pickup timing of another one of the cameras and take an image of a subject, and which acquires a shot image from each of the cameras, having: a synchronous shot image-acquiring part operable to acquire a shot image taken by each of the cameras at a common timing from the cameras; an image pickup locational information-acquiring part operable to acquire image pickup locational information showing a position of each camera at the time of image pickup of the subject from the cameras; and a display control part operable to make a display device display the shot images in a locational relation corresponding to a locational relation between the cameras, based on the image pickup locational information.

Also, according to another aspect of the invention, provided is an information-processing device which is connected through a communication network with a plurality of cameras each operable to synchronize an image pickup timing thereof with an image-pickup timing of another one of the cameras and take an image of a subject, and which acquires a shot image from each of the cameras, having: a synchronous shot image-acquiring part operable to acquire a shot image taken by each of the cameras at a common timing from the cameras; a face detecting part operable to detect a face image of a person from each of the shot images; a face-recognizing part operable to identify a person appropriate for the face image based on the detected face image; and a personage-memorizing part operable to associate and memorize information of the person identified by the face-recognizing part from at least one of the shot images acquired by the synchronous shot image-acquiring part with all the shot images to memorize the information.

As described above, according to the invention, when an image of the same subject is taken by two or more cameras at a common timing, a shot image in which the subject comes out under a good condition can be selected from the resultant shot images and shown to a user, automatically.

BRIEF DESCRIPTION OF THE DRAWINGS

FIGS. 10A and 10B are illustrations showing evaluation values in the embodiment;

FIGS. 13A-13E are illustrations showing evaluation values in the embodiment;

DESCRIPTION OF THE PREFERRED EMBODIMENTS

Figure 1:
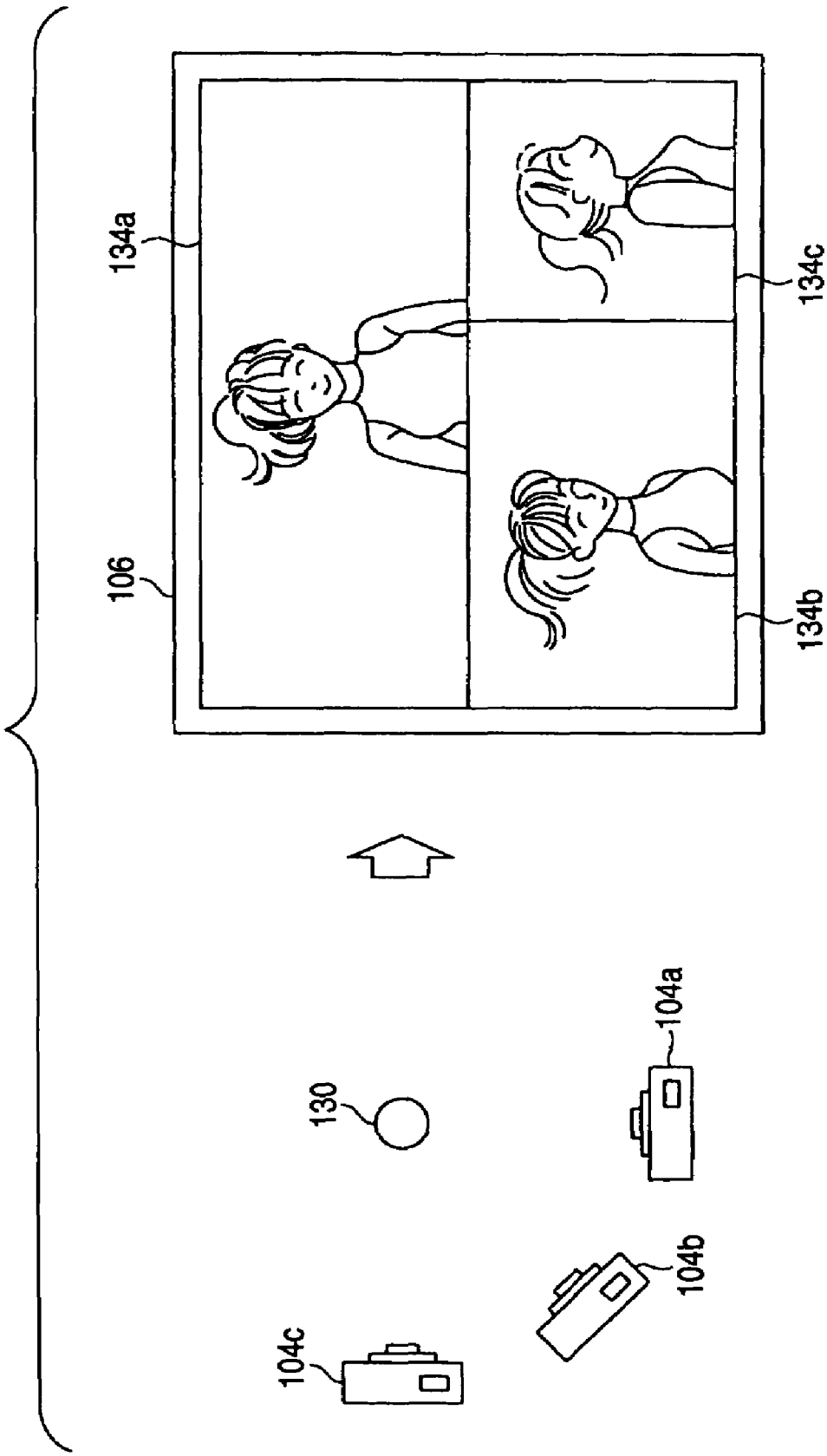
FIG. 1 is an illustration showing the first embodiment of the invention.

The preferred embodiments of the invention will be described below in detail with reference to the accompanying drawings. In the specifications hereof and the drawings, the constituents having substantially the same functional configuration are identified by the same reference character to avoid repeated descriptions.

First Embodiment

A camera system in association with the invention is applied to the camera system 100 as the first embodiment of the invention, and the camera system 100 will be described below. The camera system 100 uses two or more cameras to take images of a subject at a common timing, and displays the shot images on a display device according to what condition the subject in each of images taken by the two or more cameras comes out in. First, the general outline of the embodiment will be presented with reference to FIG. 1.

Outline of the Embodiment

The camera system 100 in association with the first embodiment uses two or more cameras 104a, 104b, 104c to take photographs of a subject 130, as shown in FIG. 1. The cameras 104a, 104b, 104c are disposed in different places. For example, when images of the subject 130 are taken from different angles by the cameras 104a, 104b, 104c as shown in the drawing, the subject 130 comes out at different angles in the shot images, which are taken by the cameras 104a, 104b, 104c respectively. Also, when images of the subject 130 are taken from different distance by the cameras 104a, 104b, 104c, the subject 130 comes out in the shot images respectively taken by the cameras 104a, 104b, 104c so that the size of the subject 130 with respect to the whole shot image varies from image to another.

Further, with the camera system 100 in association with the embodiment, images of the subject 130 are taken by the cameras 104a, 104b, 104c at a common timing. The image pickup timing can be made a common timing by exchange of notification of the timing through wireless communication between the cameras. In the camera system 100, images of the same subject 130 are taken by the cameras 104a, 104b, 104c at a common timing, and the shot image taken by each camera is displayed on the display device 106.

In the camera system 100, when a shot image is displayed on the display device 106, the shot image under a better condition is given higher priority and displayed on the display device according to what condition the subject in each shot image comes out in. When the subject 130 is, for example, a person, the criteria for judging what condition the subject in each shot image comes out in may be the angle, size and position of the face of the person in each shot image. Specifically, for example, when the angle of the face is used as the judgment criterion, judgment can be made as follows: an image in which the face of the person in the shot image is kept turned straight ahead is better in the condition of the subject in the image comes out in than another image in which the face of the person is kept turned away laterally or obliquely. Also, when the size of the face is used as the judgment criterion, judgment can be made as follows: an image in which the face of the person in the shot image is larger is better in the condition the subject in the image comes out in than another image. Further, when the position of the face is used as the judgment criterion, judgment can be made as follows: an image in which the position of the face of the person in the shot image is nearer to the center of the shot image is better in the condition the subject in the image comes out in than another image.

In the example shown by FIG. 1, a shot image 134a in which the face of a person as a subject 130 is kept turned straight ahead, a shot image 134b in which the face is kept turned away obliquely, and a shot image 134c in which the face is kept turned away laterally are taken by the cameras 104a, 104b, 104c, respectively. Then, the shot images 134a, 134b, 134c are displayed on the display device 106, which differ in size. The sizes of the displayed images are decreased in the order, the shot image 134a, shot image 134b and shot image 134c, as shown in the drawing. That is, the shot image 134a in which the face of the person as a subject 130 is kept turned straight ahead is given the highest priority and displayed among the other shot images, and the shot image 134b in which the face is kept turned away obliquely is given the higher priority and displayed in comparison to the shot image 134c in which the face is kept turned away laterally. As described above, two or more shot images are prioritized according to what condition the subject in each image comes out in, and displayed on the display device 106. Therefore, a user can see a shot image in which the subject comes out under a better condition readily, simply and easily without the need for comparing shot images to manually select the shot image under the better condition.

The outline of the embodiment has been described above. Here, the configuration of the camera system 100 to allow a shot image to be displayed according to what condition a subject in the shot image comes in will be described below.

General Configuration of Camera System

Figure 2:
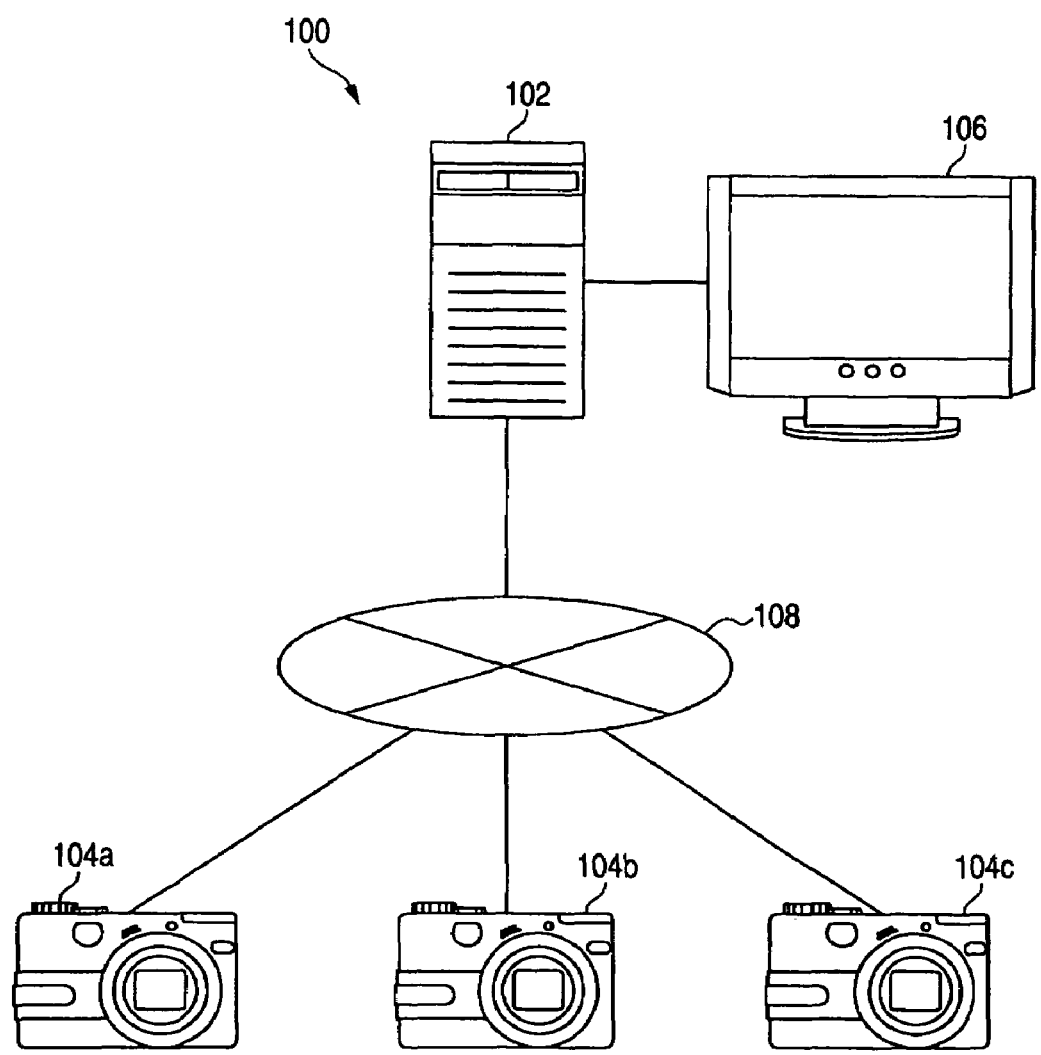
FIG. 2 is an illustration showing a general configuration of a camera system according to the first embodiment.

First, the general configuration of the camera system 100 in association with the embodiment will be described with reference to FIG. 2. As shown in FIG. 2, the camera system 100 mainly includes: an information-processing device 102; a display device 106; a communication network 108; and cameras 104a, 104b, 104c.

The information-processing device 102 has the function of acquiring shot images from the cameras 104a, 104b, 104c, prioritizing the shot images, and making the display device 106 display the shot images. More specifically, the information-processing device 102 detects face images from shot images acquired from the cameras 104a, 104b, 104c, and prioritizes the shot images based on the conditions of the detected face images. Then, the information-processing device 102 makes the display device 106 display the shot images according to their priorities.

The display device 106 is connected to the information-processing device 102, and has the function of displaying a shot image thereon. Examples of the display device 106 are a liquid crystal display, a CRT, a plasma display, etc. Incidentally, the display device 106 and the information-processing device 102 may be configured integrally.

The cameras 104a, 104b, 104c (hereinafter also referred to as "camera 104" simply) has the function of shooting a still image. The camera 104 has the function of synchronizing the image pickup timing with the other camera 104. Concretely, the camera 104 has the function of wireless communication, as an example of an image-pickup synchronizing part, and exchanges information with the other camera 104. More specifically, for example, the cameras 104a, 104b, 104c each has a button to call for shooting of an image. When the button that one of the cameras 104a, 104b, 104c has is pushed, that camera 104 with its button pushed notifies the other camera 104 through wireless communication that the button is pushed down. Then, just after the notification, or after a predetermined length of time has elapsed, each camera 104 releases the shutter to take an image of a subject. Thus, the cameras 104a, 104b, 104c can take images at a common timing. Now, it is noted that the image pickup timings of the respective cameras 104 may be exactly the same, or may be different as long as they are within a predetermined range. The camera 104 sends a shot image to the information-processing device 102 through the communication network 108 after taking the image. Now, it is noted that while in this embodiment a shot image taken by the camera 104 is a still image, the invention is not limited to such example and the shot image may be a moving image.

Also, the camera 104 has the function of detecting locational information for detecting of the position of itself by a GPS (Global Positioning System) or a beacon. Therefore, the camera 104 can send its locational information to the information-processing device 102. Further, the camera 104 includes an electronic compass, and it can send the information on image pickup bearing at the time of taking an image to the information-processing device 102. Also, the camera 104 has the function of detecting a tilt angle, and it can send the information on a tilt angle at the time of taking an image to the information-processing device 102.

The communication network 108 is e.g. a public network such as the Internet, a telephone network or a satellite communication network, or a leased line network such as WAN, LAN or IP-VPN, regardless of whether or not it is intended for wireless.

In the camera system 100 arranged according to the above configuration, shot images taken by the cameras 104a, 104b, 104c at a common timing are gathered in the information-processing device 102. The information-processing device 102 evaluates the shot images according to predetermined criteria, and makes the display device 106 display the shot images from the one in which the subject comes out under the best condition in order of priority. The general configuration of the camera system 100 has been described above. It is noted that while the number of the cameras are three in the illustrated example, it may be two or at least four.

Hardware Configuration of Information Processing Device

Figure 3:
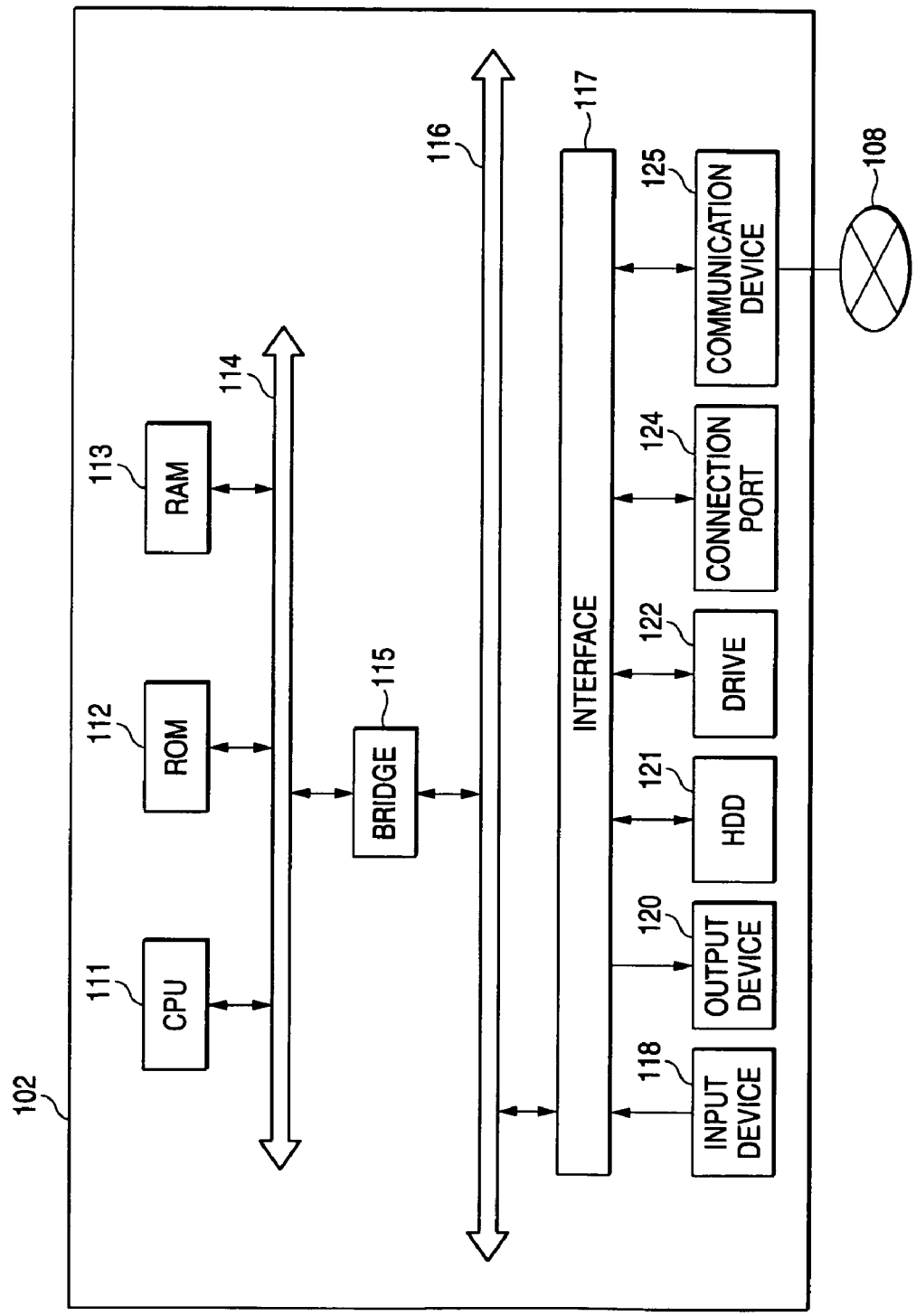
FIG. 3 is a block diagram showing a hardware configuration of an information-processing device according to the first embodiment.

Next, a hardware configuration of the information-processing device 102 will be described with reference to FIG. 3. As shown in FIG. 3, the information-processing device 102 includes, for example, a CPU (Central Processing Unit) 111, a ROM (Read Only Memory) 112, a RAM (Random Access Memory) 113, a host bus 114, a bridge 115, an external bus 116, an interface 117, an input device 118, an output device 120, a storage device (HDD) 121, a drive 122, a connection port 124 and a communication device 125.

The CPU 111 serves as both an arithmetic processing unit and a control unit, and it works following various kinds of programs stored in ROM 112 or HDD 121, and controls the parts in the information-processing device 102. As for specific processes, CPU 111 carries out, for example, a process for detecting a face image from a shot image, and a process for prioritizing shot images.

ROM 112 stores a program, an operation parameter which CPU 111 uses, etc. RAM 113 temporarily stores a program used when CPU 111 executes a process, a parameter appropriately varying during the execution, etc. Also, RAM 113 can be used to temporarily save a shot image input to the information-processing device 102, etc. Those are interconnected through the host bus 114 including a CPU bus.

The host bus 114 is connected to the external bus 116 such as a PCI (Peripheral Component Interconnect/Interface) bus.

The input device 118 includes an operation means e.g. a mouse, a keyboard, a touch panel, a button, a switch or a lever and an input control circuit for producing an input signal to output the signal to CPU 111. A user of the information-processing device 102 can operate the input device 118, thereby to input various kinds of data to the information-processing device 102 and provide an instruction for a processing operation for the device 102.

The output device 120 is constituted by a display device including e.g. a CRT (Cathode Ray Tube) display device or liquid crystal display (LCD) device and a lamp, an audio output device, such as a speaker, and others. The output device 120 outputs a shot image, for example. Also, the output device 120 may serve as a control part for controlling an output device used as an external apparatus, which is provided outside the information-processing device 102.

HDD 121 is a device for data storage arranged as an example of storage means of the information-processing device 102 in association with this embodiment. In HDD 121, a program that CPU 111 executes, various kinds of data are stored. In HDD 121, various kinds of data, e.g. a shot image, may be stored.

The drive 122 is a reader/writer for storage medium. The drive 122 is built in the information-processing device 102 or attached to the device 102 externally. The drive 122 performs recording/playback of various kinds of data, such as content, with respect to a removable storage medium, such as a magnetic disk (e.g. HD), an optical disk (e.g. CD or DVD), a magneto-optical disk (e.g. MO), or a semiconductor memory, which has been loaded into the information-processing device 102.

Specifically, the drive 122 reads out data stored on a removable storage medium, and supplies the data to RAM 113 connected thereto through the interface 117, the external bus 116, the bridge 115 and the host bus 114. CPU 111 stores the data in HDD 121 or the like, as required. On the other hand, the drive 122 receives the following from CPU 111: data stored in e.g. ROM 112 or HDD 121; newly created data; and data acquired from an external device. Then, the drive 122 writes the data into a removable storage medium.

The connection port 124 is, for example, a port for connecting the information-processing device 102 with an external apparatus, such as the display device 106. The connection port 124 has connection terminals of USB, IEEE1394 and the like. The connection port 124 is connected to CPU 111 and others through the interface 117, the external bus 116, the bridge 115, the host bus 114, etc.

The communication device 125 is a communication interface constituted by e.g. a communication device for connecting to the communication network 108. The communication device 125 exchanges various kinds of data with an external apparatus through the communication network 108. The hardware configuration of the information-processing device 102 has been described above briefly.

Functional Configuration of Information Processing Device

Figure 4:
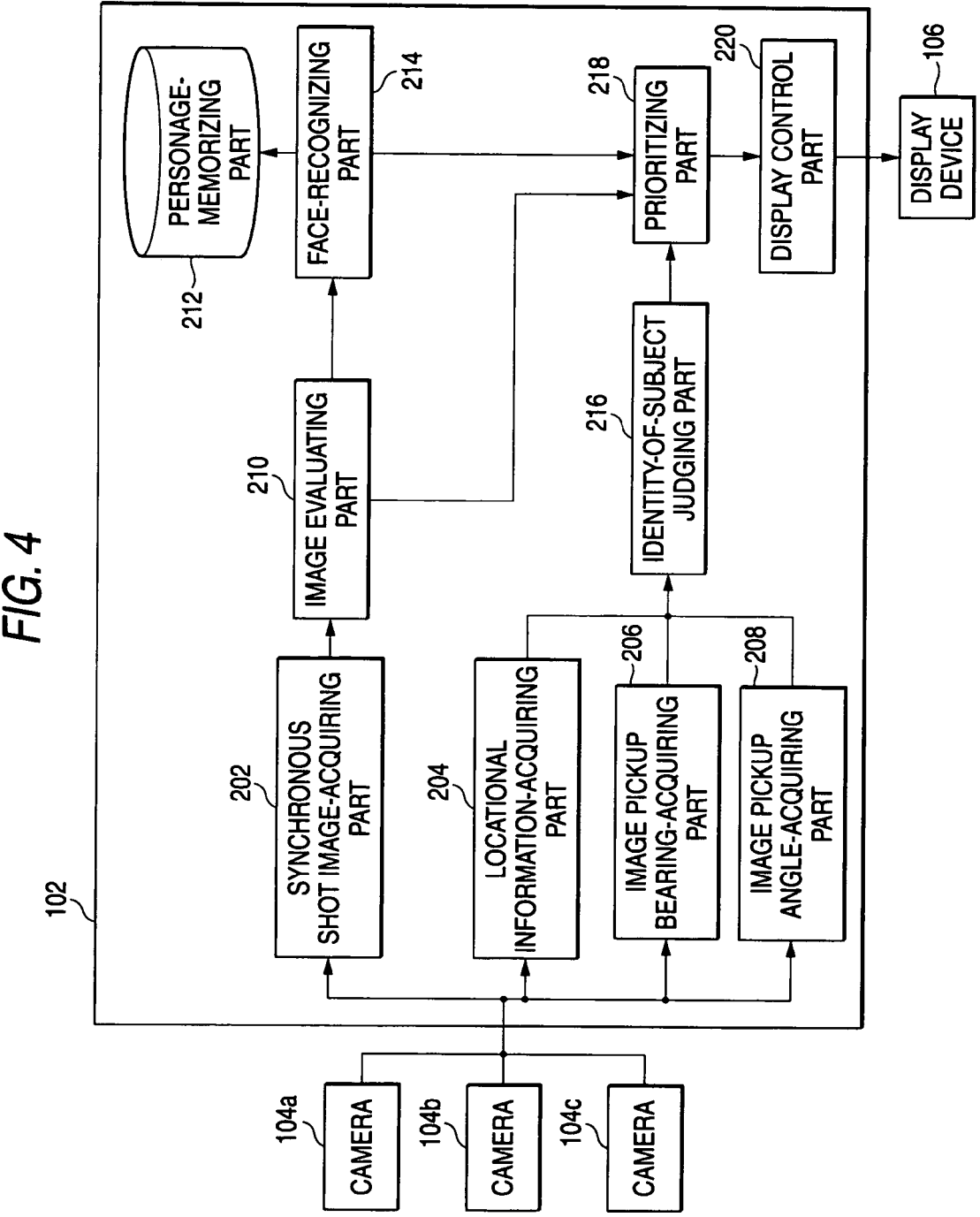
FIG. 4 is a block diagram showing a functional configuration of the information-processing device according to the first embodiment.

Now, a functional configuration of the information-processing device 102 will be described with reference to FIG. 4. The information-processing device 102 primarily includes: a synchronous shot image-acquiring part 202; a locational information-acquiring part 204; an image pickup bearing-acquiring part 206; an image pickup angle-acquiring part 208; an image-evaluating part 210; a personage-memorizing part 212; a face-recognizing part 214; an identity-of-subject judging part 216; a prioritizing part 218; and a display control part 220.

The synchronous shot image-acquiring part 202 acquires shot images from the cameras 104a, 104b, 104c, provided that the images have been taken by the cameras at a common timing. The cameras 104 each mark a shot image with the image pickup time and send the shot image with the image pickup time marked thereon to the information-processing device 102. Then, the information-processing device 102 can recognize the shot images to be the ones which have been taken at a common timing.

The image-evaluating part 210 evaluates the respective shot images taken at a common timing, which the synchronous shot image-acquiring part 202 has acquired, in the condition of the subject in the shot images based on predetermined evaluation criteria, and assigns evaluation values to the shot images respectively. In this embodiment, the image-evaluating part 210 detects face images of the person from the shot images, and determines evaluation values of the shot images based on the conditions of the detected face images. More specifically, the evaluation value is determined based on the angle of face in the detected face image, the size of the face image and the position of the face image in the shot image. Further, when two or more face images are detected from shot images, the number of the detected face images is also reflected by the evaluation values.

Detection of a face image from a shot image can be performed by a method described in e.g. Koutaro Sabe, Kenichi Hidai: *Learning of Real-Time, Random Posture Face Detector using Pixel Difference Feature*. The overview of the method will be described below.

High-speed computable pixel difference features are used to execute the learning of a face pattern detector for each posture so that a weak hypothesis is arranged in a tree structure by AdaBoost, whereby a face detector for a random posture is arranged. In this time, high-speed computable pixel difference features are used for the ensemble learning. In addition, the function of breaking off the weighted majority operation of weak hypothesis at the time when results enough to calculate are obtained during discrimination is introduced. Further, a method of computing pixel difference features in parallel at a high speed is used making good use of the simplicity of pixel difference features. Moreover, a discriminator of a tree structure is arranged, which diverges and fractionizes gradually from the weak hypothesis for discriminating face patterns of all the postures so as to discriminate a face pattern of each posture. The discriminator is used to detect a face image.

The pixel difference is the difference between two arbitrary pixel values within a window targeted for detection of face image. A histogram of the difference value outputs is prepared with respect to training samples. Then, the threshold which is the minimum in discrimination error is determined. This process is performed on all the combinations of pixels, and a combination of pixels and the threshold which is minimum in discrimination error is adopted as a weak hypothesis. The weak hypothesis is determined as follows.

1. Repeat a set of the following steps M times:

a) Decide two pixels $I_1$, $I_2$ randomly.

b) Calculation of a threshold which is the minimum in error. Determine a threshold $T_{min}$ which makes the following Expression 1 minimum $e_{min}$.

$$e_t = \sum_{i: f_t(x_i) \neq y_i} D_{t,i} \qquad \text{(Expression 1)}$$

c) Calculation of a threshold which is the maximum in error. Determine a threshold $T_{max}$ which makes the above Expression 1 maximum $e_{max}$, and then invert the resultant value in sign by the method according to the following Expression 2.

$e'_{max} = 1 - e_{max}$ $I'_1 = I_2$ $I'_2 = I_1$ $T'_{max} = -T_{max}$ \qquad (Expression 2)

d) If $e_{min} < e'_{max}$, then determine a combination of $I_1$, $I_2$ and $T_{min}$ as a weak hypothesis. Otherwise, determine a combination of $I'_1$, $I'_2$, and $T_{max}$ as a weak hypothesis.

2. Adopt the weak hypothesis which is the minimum in error e during the repetitions.

During discrimination, the operation expressed by the following Expression 3 is executed, whereby the weak hypothesis can be computed.

$y = f_t(x) = \text{sign}(x(k_1) - x(k_2) - \theta_t)$ \qquad (Expression 3)

where x is a brightness value of the input window image, $k_1$ and $k_2$ represent locations of the pixels, q is a threshold.

According to AdaBoost, the upper limit of training error is reduced each time one weak hypothesis is added, approaching a discriminator with a better performance. In other words, a proper discriminator is formed by only weak hypotheses obtained halfway through the process, and therefore the discriminator can achieve sufficient discrimination depending on the input. Using such discriminator, the computation can be broken off to make a judgment as long as the result of the majority operation obtained halfway through the process is a sufficiently small value.

The following Expression 4 is an expression of the weighted majority operation:

$$F(x) = \sum_t \alpha_t f_t(x) \qquad \text{(Expression 4)}$$

Figure 5:
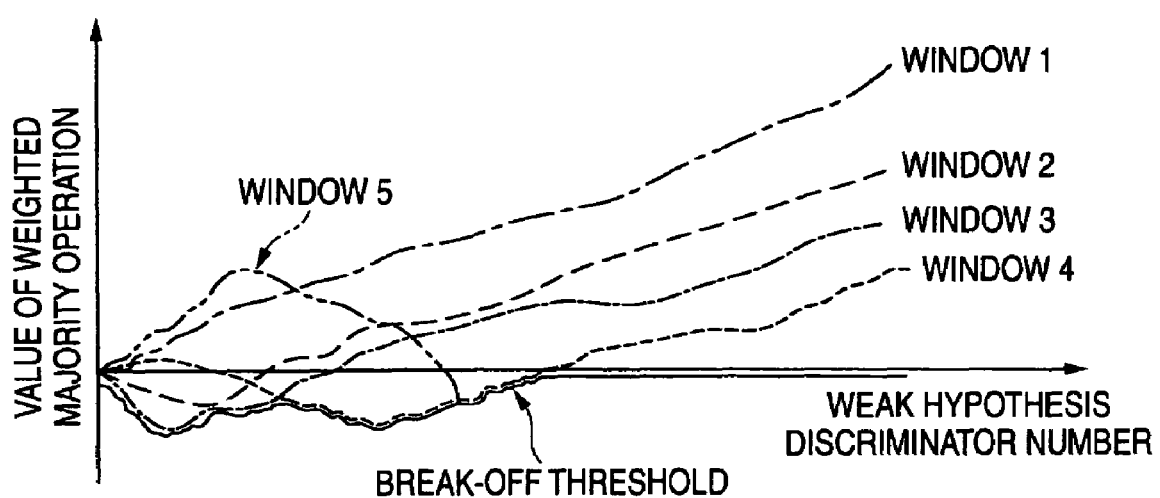
FIG. 5 is a graph of assistance in explaining a process of detecting a face, which the information-processing device in association with the embodiment performs.

Referring to FIG. 5, there is shown an example in which changes in the value resulting from the weighted majority operation when it is continued to increase t (the number of weak hypotheses) are plotted. Typical reaction when a face image is input to the face detector is a gradual increase toward the plus direction with an increase in the number of weak hypotheses, as shown by Windows 1 to 4 in the drawing. In contrast, when a non-face image is provided as an input, the value resulting from the weighted majority operation decreases toward the minus direction gradually (Window 5). In this case, setting a certain break-off threshold can terminate the computation by the weighted majority operation, which decreases toward the minus direction, halfway.

The break-off threshold takes on the maximum value which enables passage of all the targets of learning sample data. In the case shown in FIG. 5, when it is assumed that Windows 1 to 4 indicate all the target data, the minimum value of all the targets data makes the break-off threshold. The break-off threshold $R_t$ corresponding to the expression $F_t(x)$ of the weighted majority operation when the $t^{th}$ weak hypothesis is added is formulated as the following Expression 5.

$R_t = \min[F_t(x_1), F_t(x_2), \ldots, F_t(x_N)]$ \qquad (Expression 5)

The face detector for random posture will be described below. The pattern of a face differs widely depending on the posture. On this account, it is difficult for one discriminator to constitute a face detector with a good performance. Therefore, while taking over the results from discriminators of face and non-face images for all the postures, the learning of a discriminator diverging into discriminators for face and non-face images for each posture is performed. Particularly, the posture classification in a low-level hierarchical rank is arranged so as to be in a tree structure such that a posture classification in a higher-level hierarchical rank is further divided. Therefore, the results derived from the operation in the higher-level hierarchical rank are taken over, and an operation in the low-level hierarchical rank is executed.

Figure 6:
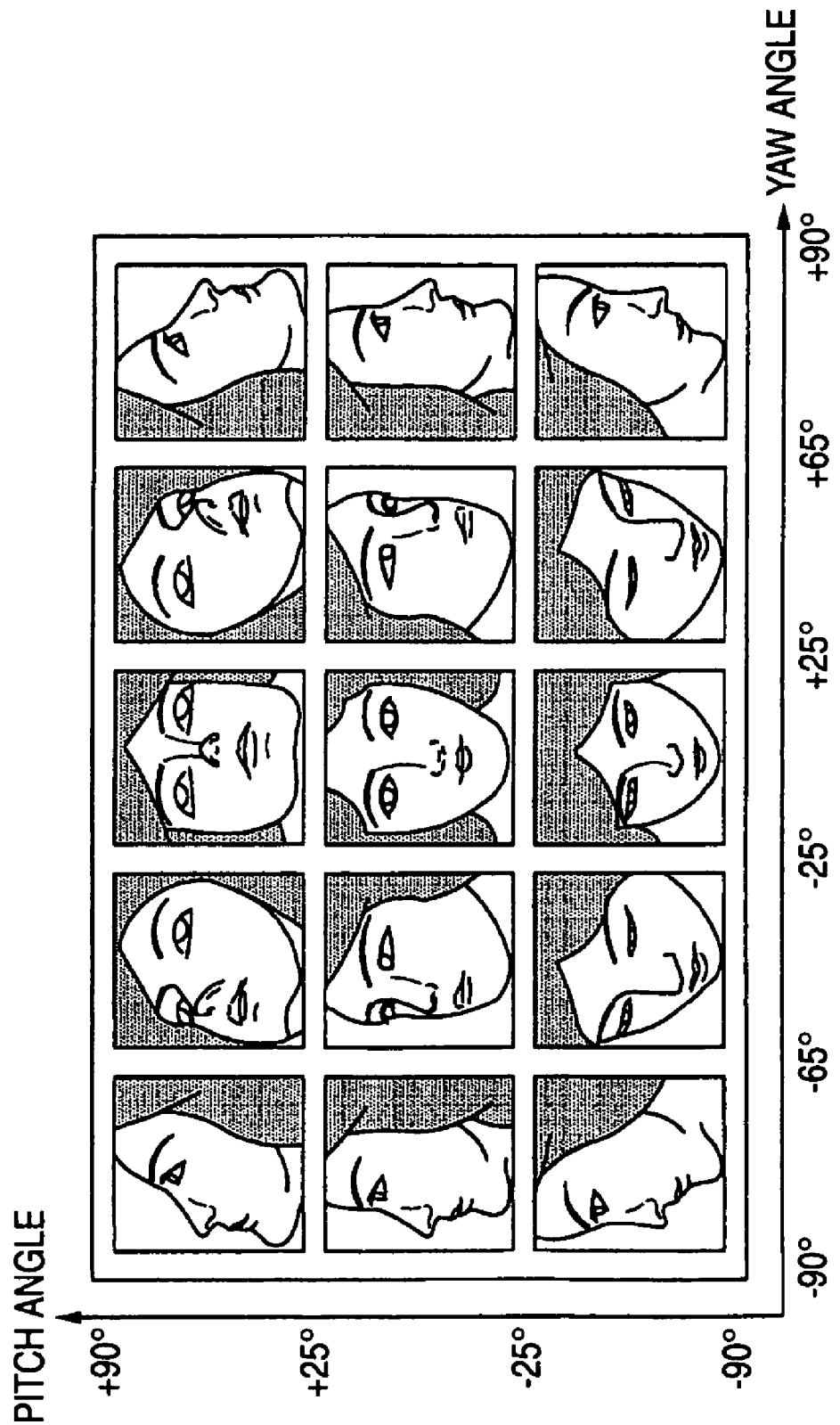
FIG. 6 is an illustration of assistance in explaining the process of detecting a face, which the information-processing device in association with the embodiment performs.

First, the classification of postures is performed. Postures of a face are classified by pitch and yaw angles when the sight line is kept level. The pitch angle is classified into the three steps of −90° to −25°, −25° to +25°, +25° to +90°. The yaw angle is classified into the five steps of −90° to −65°, −65° to −25°, −25° to +25°, +25° to +65°, +65° to +90°. Thus, postures of the face are grouped into an aggregate of 15 discrete groups. FIG. 6 shows averages of learning data for the respective posture groups.

Figure 7:
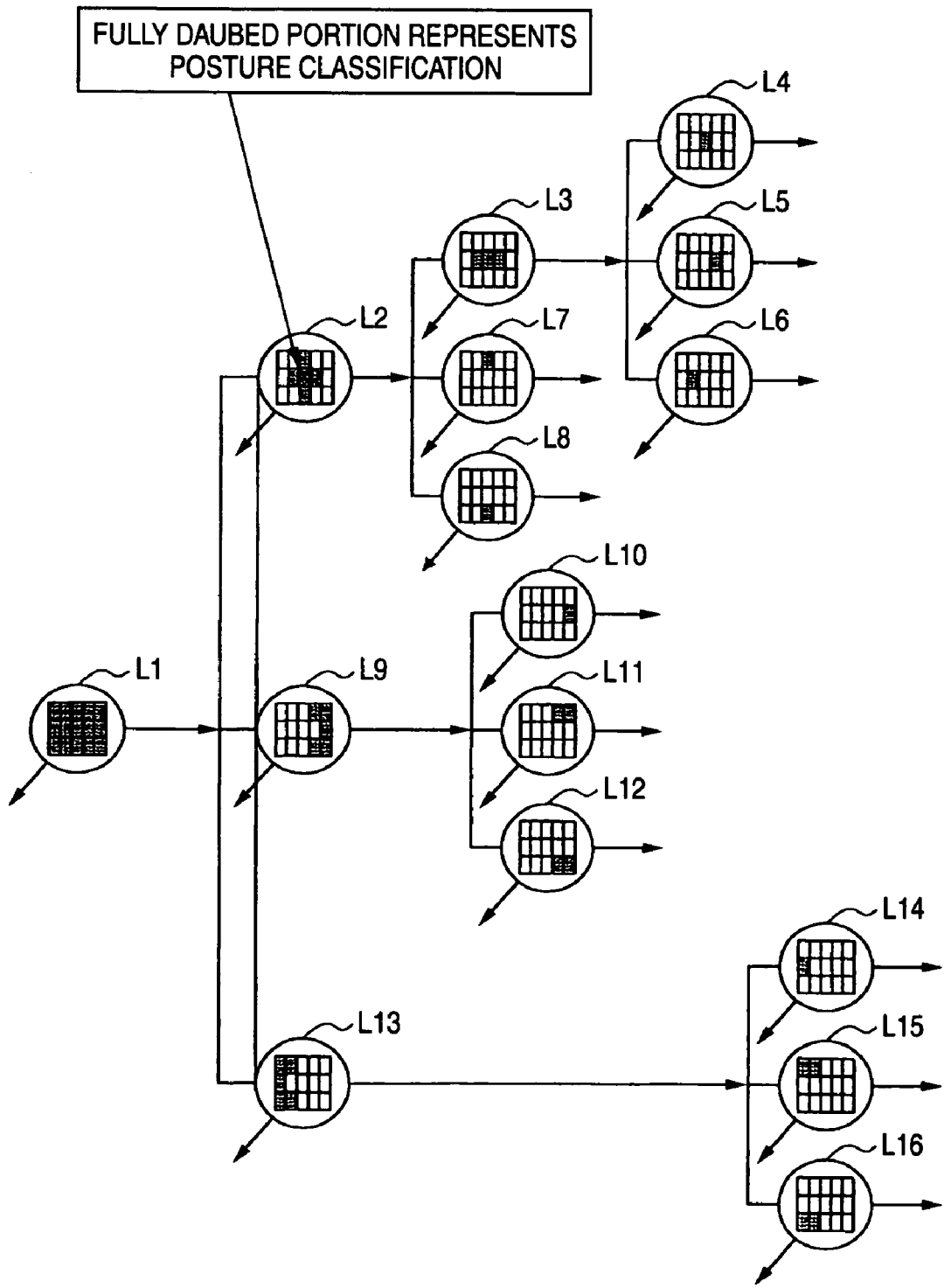
FIG. 7 is an illustration of assistance in explaining the process of detecting a face, which the information-processing device in association with the embodiment performs.

Next, a discriminator having a tree structure is arranged. FIG. 7 shows the configuration of a tree structure of a discriminator which detects faces actually classified according to postures. Each circle represents a series of weak hypothesis groups (node), and 15 boxes shown in the circle represent 15 posture groups representatively exemplified in FIG. 6. In each circle, the fully daubed posture group is a posture group of samples used for learning of the weak hypothesis group. In addition, the arrows pointing in a lower left direction shows the case where the break-off takes place during evaluation of the weak hypothesis group. The rightward arrow shows that the process flow passes through the series of the weak hypothesis groups rightward without break-off, and then goes into the next series of weak hypothesis groups. When the process flow reaches a right end of the tree, the evaluation is terminated. As for the series of weak hypothesis groups located in the root of the tree, all the posture samples are used for the learning. For example, at the time when 100 weak hypotheses are selected, the divergence is caused. In the example shown in the drawing, the process flow diverges into three posture groups of fullface, right half face and left half face. The fullface group is further divided into three, e.g. upper, middle and lower groups, and the middle group is further divided into middle, somewhat right and somewhat left groups. Thereafter, the right half face and left half face are each divided into upper, middle and lower groups, and subjected to the judgment finally.

Next, the procedures of learning will be shown. At each node, the above-described pixel features are determined by learning according to AdaBoost used for weak hypotheses. Here, learning samples to be supplied and the take-over of the results from a high-level (parent) node to a low-level (child) node are controlled. The samples used for the learning at each node are selected as follows. For positive samples (face images), all the samples belonging to corresponding posture groups based on the definition of the tree structure are used. For negative samples (non-face images), all the samples are used for the root node. After that, the samples, which were not below the break-off threshold as a result of the learning at a parent node, are used for the learning at a child node. Take-over of the results are performed as follows. When the learning at each node is finished, a weight D with respect to each sample and the result of the weighted majority operation F(x) for the sample are obtained. The samples used at a child node constitute a subset of samples for its parent node according to the above-described method of selecting samples. Therefore, of their weights and results of the majority operation, only the weights and results which are to be used at a child node are delivered to the child node. As for the weights, their total will not be one (1) and as such, they are re-normalized so that the sum of the weights for positive samples and the sum of negative samples are each 0.5. While the weighted majority operation is necessary when the break-off threshold is computed, a weak hypothesis newly added at a child node is added to the weighted majority operation which is taken over from the parent node. Thus, a judgment reflecting the feature selected at the parent node is made.

Also, during discrimination, the evaluation is made from the root node as performed in the learning. When the break-off takes place at the root node, the evaluation is terminated and −1 (non-face) is output. The F of the weighted majority operation of an image which has passed through a parent node is delivered to a child node. The evaluation at the child nodes which the tree diverges from the parent node to is made in turn. When the break-off takes place at a child node, the process flow is returned back to the diverging point and then the evaluation at a remaining child node is made. When the process flow reaches the end of a branch somewhere in the tree without being broken off, it is judged that the sample is of a face image. Then, the posture group corresponding to the end node is output as a direction of the face of the input image. In the case where the process flow has not reached the end in any branches, it is judged the sample is of a non-face image.

In this embodiment, the image-evaluating part 210 performs detection of a face image according to the above-described method, and outputs e.g. the number of each discriminator (L4, L5, etc.) shown in FIG. 7 as a detected face angle. Also, the image-evaluating part 210 outputs the number and sizes of detected face images, and their locational information in a shot images. The image-evaluating part 210 may use a well-known method of detecting a face for the purpose of outputting the number and sizes of detected face images, and their locational information in the shot images.

Referring to FIG. 4 again, the description on the functional configuration of the information-processing device 102 will be continued. Based on the detected face images from shot images by the image-evaluating part 210, the face-recognizing part 214 identifies a person corresponding to the face image. The face-recognizing part 214 holds data of a previously registered face image which is associated with e.g. the name and ID of a person identified based on the face image data. The face-recognizing part 214 compares a detected face image with previously registered face image data, thereby to identify a person appropriate for the detected face image. The face-recognizing part 214 links the name of a person identified from a face image in at least one of shot images taken at a common timing, which the synchronous shot image-acquiring part 202 has acquired, with all the shot images taken at a common timing and stores the name in the personage-memorizing part 212.

The personage-memorizing part 212 links information on a person identified by the face-recognizing part 214 from at least one of shot images, which the synchronous shot image-acquiring part 202 has acquired, with all the shot images and memorizes the information. There is a high probability that the same person is photographed in shot images taken at a common timing. However, even when a person is in a shot image, it is difficult for the image-evaluating part 210 to detect his or her face image depending on e.g. the direction of the face of the person, and it is difficult for the face-recognizing part 214 to recognize the face. Hence, assuming that a person identified from at least one of shot images comes out in another shot image taken at the same timing, the information on the person (including his or her name and ID) is linked to all the shot images and registered in the personage-memorizing part 212. If doing so, for example, when a user desires to see or download a shot image in which the user comes out, the information-processing device 102 can acquire the ID and name of the user, and bring up a shot image associated with the appropriate ID and name memorized by the personage-memorizing part 212 to the user, thereby to provide all the shot images in which the user comes out.

The locational information-acquiring part 204 acquires the locational information of each camera at the time of image pickup from each of the cameras 104a, 104b, 104c, and provides the acquired locational information to the identity-of-subject judging part 216.

The image pickup bearing-acquiring part 206 acquires information on an image pickup bearing at the time of image pickup from each of the cameras 104a, 104b, 104c, and provides the acquired information on image pickup bearings to the identity-of-subject judging part 216.

The image pickup angle-acquiring part 208 acquires information of a tilt angle at the time of image pickup from each of the cameras 104a, 104b, 104c, and provides the acquired tilt angle information to the identity-of-subject judging part 216.

The identity-of-subject judging part 216 acquires the locational information, image pickup bearing information, and tilt angle information at the time of image pickup on the cameras 104a, 104b, 104c, and judges whether or not the subjects photographed by the cameras 104 are identical. For example, in the case where a certain camera 104a is spaced away from other cameras 104b and 104c by a predetermined distance or larger, the identity-of-subject judging part 216 judges from the locational information that the subject photographed by the camera 104a is not the same as the subject photographed by the cameras 104b and 104c, and notifies the judgment to the prioritizing part 218. Also, even when the cameras 104a, 104b, 104c are located at a distance shorter than the predetermined distance from one another, the identity-of-subject judging part 216 can recognize depending on the image pickup bearing or tilt angle that the subjects photographed by the cameras 104 are not the same. In this case, the identity-of-subject judging part 216 can notify that to the prioritizing part 218.

The prioritizing part 218 assigns a priority to each shot image according to the evaluation value assigned to the shot image by the image-evaluating part 210. More specifically, the prioritizing part 218 assigns a higher priority to a shot image including a fullface image of a person in comparison to a shot image including a face of the person photographed from another angle other than the fullface angle according to the evaluation value assigned by the image-evaluating part 210 based on the face angle of the face image. Also, the prioritizing part 218 assigns a higher priority to a shot image whose face image has a size of a predetermined value or larger in comparison to a shot image whose face image has a size smaller than the predetermined value, according to the evaluation value assigned by the image-evaluating part 210 based on the size of the face image. Further, the prioritizing part 218 assigns a higher priority to a shot image whose face image is located at a distance shorter than a predetermined distance from the center of the shot image in comparison to a shot image whose face image is located at a distance longer than the predetermined distance from the center of the shot image, according to the evaluation value assigned by the image-evaluating part 210 based on the position of the face image in shot image. The higher priority the prioritizing part 218 may assign to a shot image, the larger the number of face images detected by the image-evaluating part 210 is.

In this embodiment, the prioritizing part 218 prioritizes shot images in consideration of all the number of detected face images, the angle of a face, the size and position of a face image. This will be described later in detail with reference to FIG. 10. Also, the prioritizing part 218 can prioritize shot images focusing on a particular person in the shot images. This will be described later in detail with reference to FIG. 13. After prioritizing shot images, the prioritizing part 218 associates the shot images to their order and provides them to the display control part 220.

The display control part 220 makes the display device 106 display shot images acquired from the prioritizing part 218 following the priority order associated to shot images, in which a shot image with a higher priority takes precedence. More specifically, the display control part 220 makes the display device 106 display shot images in turn from one having a higher priority following their priority order. Also, the display control part 220 can make the display device 106 display shot images with their image size changed in turn from one having a higher priority following their priority order. The functional configuration of the information-processing device 102 has been described above.

Flow of Information Processing

Next, the flow of information processing by the information-processing device 102 will be described with reference to FIGS. 8 to 13. First, the flow of information processing in the case of assigning a higher priority to a shot image which satisfies the following conditions will be described with reference to FIGS. 8 to 11: more face images are detected from the shot image; the percentage of the detected face image in which the face is kept turned straight ahead is higher; the percentage of the detected face image whose size is large is higher; and the percentage of the detected face image located near the center of the shot image is higher. After that, the flow of image processing in the case of assigning a higher priority to a shot image which satisfies the following conditions in regard to a person whose face image is detected from shot images and identified by the face-recognizing process will be described with reference to FIGS. 12 and 13: the direction of the face of the person is more closely a direction in which the face is kept turned straight ahead; the face image of the person is larger; and the position of the face image is nearer to the center of the shot image.

Figure 8:
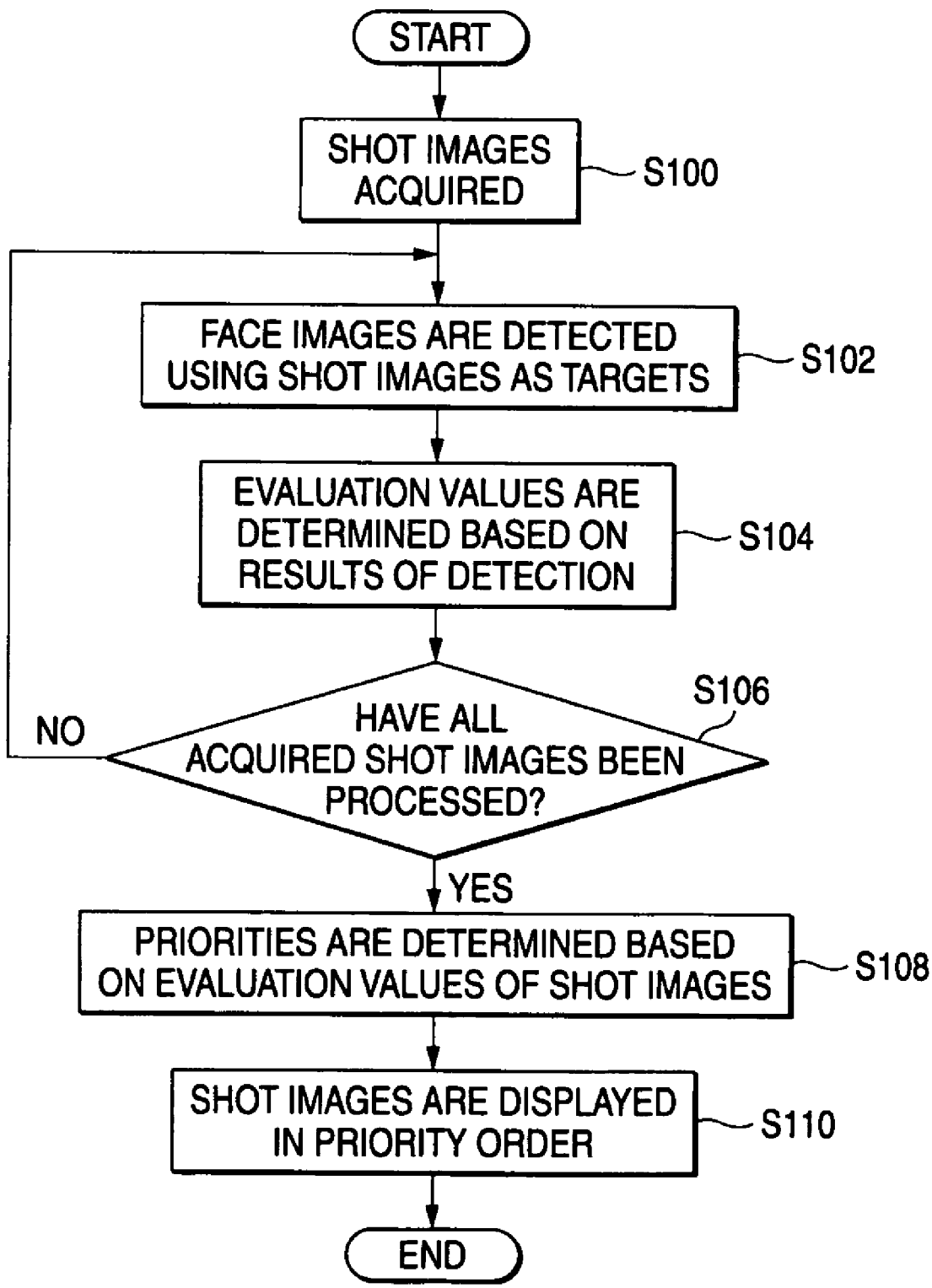
FIG. 8 is a flow chart showing the flow of information processing in the embodiment.

As shown in FIG. 8, the information-processing device 102 acquires shot images taken by cameras 104 at a common timing from the cameras 104 (S100). When acquiring the shot images, the information-processing device 102 detects a face image targeting the shot images (S102). Then, the information-processing device 102 determines the evaluation value based on the condition of the detected face image (S104). After performing detection of face images and determination of the evaluation value on all the shot images (S106), the information-processing device 102 determines the priorities based on the evaluation values of the shot images (S108). Then, the information-processing device 102 makes the display device 106 display the shot images in the priority order based on the priorities of shot images determined at Step S108 (S110).

The above-described process allows the information-processing device 102 to display shot images taken at a common timing on the display device 106 in the priority order. FIGS. 10A and 10B show examples of evaluation values assigned to shot images by the information-processing device 102 and assignment of priorities based on the evaluation values.

As shown in FIG. 10A, the information-processing device 102 evaluates shot images by entering values in the items of Number of Detected Faces 310, Face Angle 312, Face Size 314, and Face Position 316 for the shot images. Number of Detected Faces 310 shows the number of face images detected from a shot image. In the example shown in the drawing, five face images are detected from a shot image A 302, seven face images are detected from a shot image B 304, and two face images are detected from a shot image C 306.

Face angle 312 shows the number of the face images in which the fullface comes out, and the number of the face images in which a side face comes out, of all the detected face images. In regard to the fullface and side face, e.g. the numerals (L4, L5, etc.) of the discriminators shown in FIG. 7 may be previously associated to the front and side faces, thereby making possible to determine whether the face image is of the fullface or side face according to the output numeral of a discriminator. In other words, for example, in the case where the direction of the face in a detected face image is the direction corresponding to the discriminators of L4, L7 and L8, the face image is counted as an image of the fullface. On the other hand, in the case where the direction of the face in a detected face image is the direction corresponding to discriminators other than ones indicated by L4, L5 and L6, the face image is counted as an image of the side face. In the example shown in the drawing, of the five face images detected from the shot image A 302, three images are of the fullface and two images are of the side face. In addition, of seven face images detected from the shot image B 304, four images are of the fullface, and three images are of side face. Further, of the two face images detected from the shot image C 306, both the two face images are of the side face.

As for Face Size 314, the sizes of the detected face images detected from a shot image are classified into three kinds of Large, Middle and Small and as such, Face Size 314 shows the number of each kind of sizes of face images. With the size of a face image, the size of a first predetermined value or larger is classified as Large, the size of a second predetermined value or larger below the first predetermined value is classified as Middle, and the size below the second predetermined value is classified as Small. In the example shown in the drawing, of the five face images detected from the shot image A 302, the sizes of two face images belong to Large, the sizes of two face images belong to Middle, and the size of one face image belongs to Small. Further, of seven face images detected from the shot image B 304, and the sizes of five face images belong to Large, the sizes of two face images belong to Middle. In addition, both the sizes of two face images detected from the shot image C306 belong to Middle.

Face Position 316 shows the position of a detected face image in the whole shot image. When the position of a face image is within a range of a predetermined distance from the center of the shot image, the position is classified as Center, and other positions are classified into Upper, Lower, Left and Right. In the example shown in the drawing, of the five face images detected from the shot image A 302, two face images are located within a range of Center of the shot image, one face image is located within a range of Upper, two face images are located within a range of Lower. In addition, of the seven face images detected from the shot image B 304, four images are located within a range of Center of the shot image, two images are located within a range of Left, and one image is located within a range of Right. Further, both the two face images detected from the shot image C306 are located within a range of Left.

The point 308 shows a point which the prioritizing part 218 assigns to each shot image in order to prioritize the shot images. The prioritizing part 218 assigns the points stored in the columns of the point 308 according to the number of detected faces, face angles, face sizes, and face positions to shot images, adds up the points for each shot image, and assigns a higher priority to a shot image of a higher points in turn from the image of the highest point resulting from the addition, in descending order of the points. Specifically, in the examples shown in the drawing, the prioritizing part 218 assigns one point with respect to the number of detected face images, five points with respect to a face image whose face angle is classified as fullface, and three points with respect to a face image whose face angle is classified as Side face. Further, the prioritizing part 218 assigns five points with respect to a face image whose face size is classified as Large, three points with respect to a face image whose face size is classified as Middle, and one point with respect to a face image whose face size is classified as Small, and it assigns five points with respect to a face image whose position is located within Center of the shot image, and two points with respect to face images whose positions are located in a range out of Center.

Referring to FIG. 10B, there are shown examples of calculation of the points by the prioritizing part 218 with respect to the shot image A 302, shot image B 304 and shot image C306 shown in FIG. 10A. The reference numeral 318 shows the example in which the prioritizing part 218 calculates the total point for the shot image A 302. As for Number of Detected Faces, the number of detected faces detected from the shot image A 302 is 5 and as such, one (1) point is assigned per unit of the face number and thus the total point is five. In regard to Face Angle, three points is assigned when the face angle of a face image detected from the shot image A 302 is classified as Fullface and two points is assigned when the face angle is classified as Side Face and as such, five points for each image of Fullface and three points for each image of Side Face and thus are added up, resulting in (3×5)+(2×3)=21. With Face Size, two points is assigned when the size of face image detected from the shot image A 302 is within a range of Large or Middle, and one point is assigned for the size of Small and as such, five points for each image of the size Large, three points for each image of the size Middle, and one point for each image of the size Small are added up, resulting in (2×5)+(2×3)+(1×1)=17. As for Face Position, two points is assigned when the position of a face image detected from the shot image A 302 in the shot image is within a range of Center and three points is assigned when the position is out of Center and as such, five points for each image whose face position is in Center, two points for each image whose face position is out of Center are added up, resulting (2×5)+(3×2)=16. Then, the total point is 59 points as shown in the drawing.

Figure 11A:
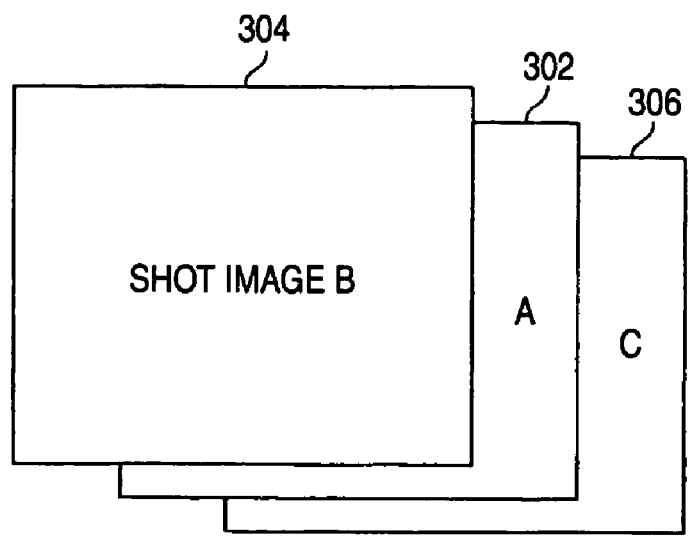
FIGS. 11A and 11B are illustrations each showing an example of display of shot images in the embodiment.
Figure 11B:
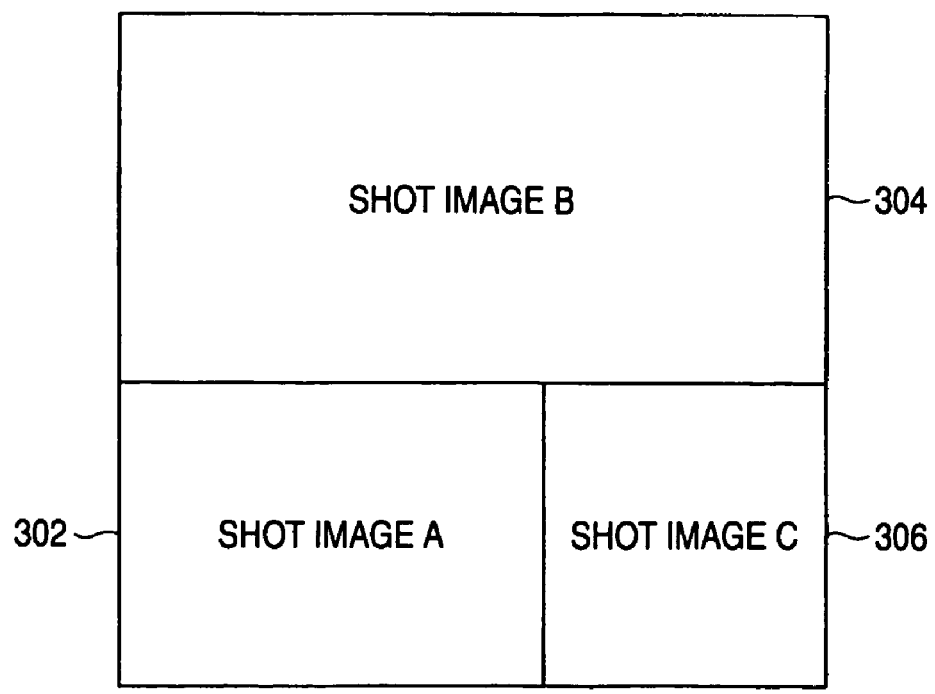
Figure 12:
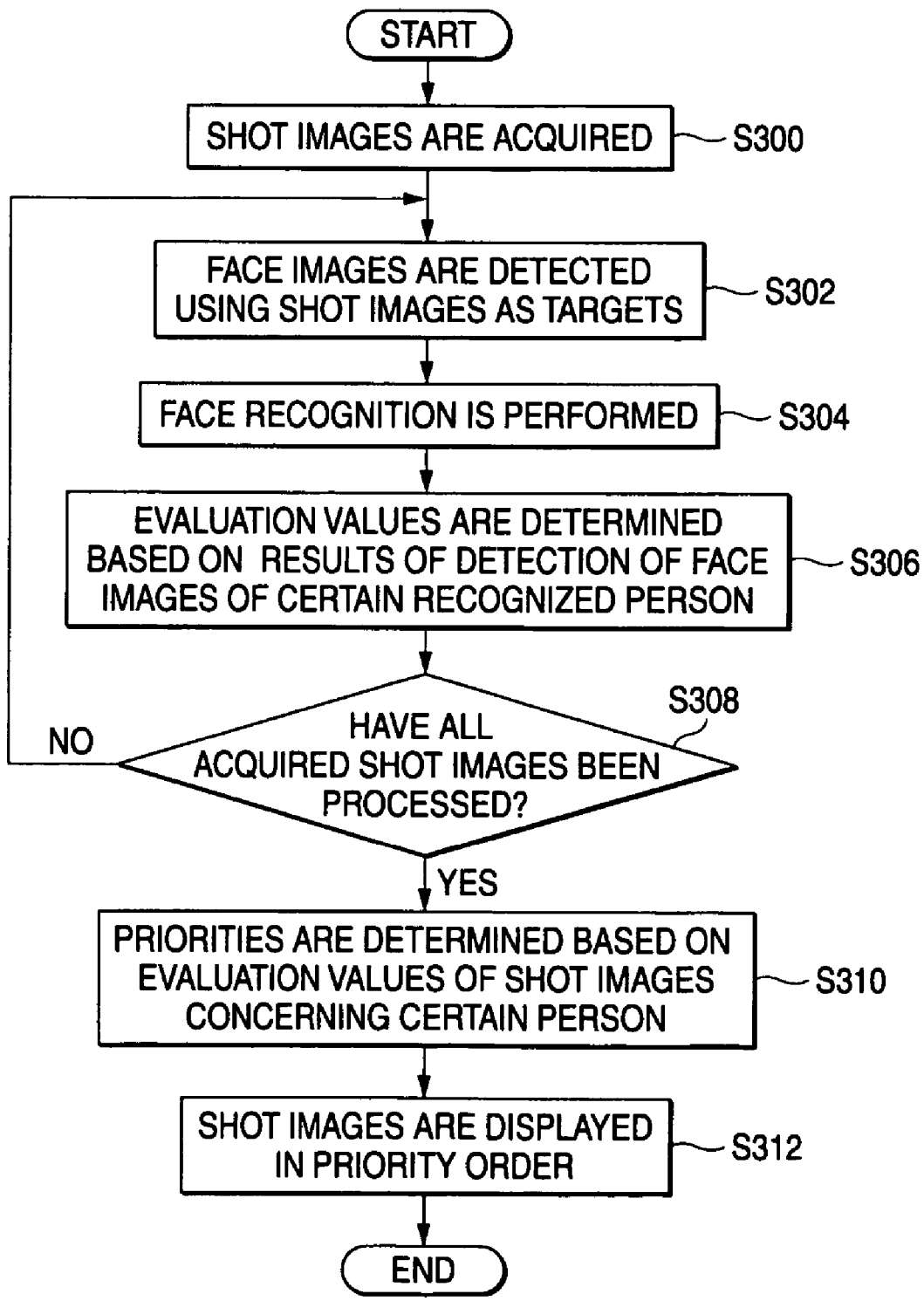
FIG. 12 is a flow chart showing the flow of information processing in the embodiment.

The prioritizing part 218 executed the point calculations for the shot image B 304 and shot image C306 in the same way as described above, and derived, as the results of the calculations, 129 points for the shot image B 304 and 18 points for the shot image C306 as shown in the drawing. After the completion of the point calculations for all the shot images, the prioritizing part 218 assigns priorities to the shot images in descending order of the points. In the example shown in the drawing, the prioritizing part 218 assigns the first place to the shot image B 304, the second place to the shot image A 302 and third place to the shot image C306. After the priorities are assigned to the shot images, the shot images are displayed on the display device 106 in the priority order. FIGS. 11A and 11B each show an example of such display.

Referring to FIG. 11A, there is shown an example in which the display device 106 is made to display shot images in turn in the priority order of the shot images. As shown in FIG. 11A, the shot image B 304, which has been assigned the first place as a result of the point calculation described with reference to FIG. 10B, is displayed on the display device 106 first. Next, the shot image A 302 assigned the second place is displayed on the display device 106. Finally, the shot image C306 assigned the third place is displayed on the display device 106. The periods of time during which the shot images are displayed on the display device 106 may be the same. Otherwise, they may be arranged so that a shot image with a higher priority displayed for a longer time.

Referring to FIG. 11B, there is shown an example in which the display device 106 is made to display shot images with their image sizes changed in the priority order of the shot images. As shown in FIG. 11B, the shot image B 304 assigned the first place as a result of the point calculation as described with reference to FIG. 10B is displayed on the display device 106 in a larger size in comparison to the other shot images. The shot image A 302 assigned the second place is displayed on the display device 106 in the second largest size subsequently to the shot image B 304. The shot image C306 assigned the third place is displayed on the display device 106 in the smallest size.

Figure 9:
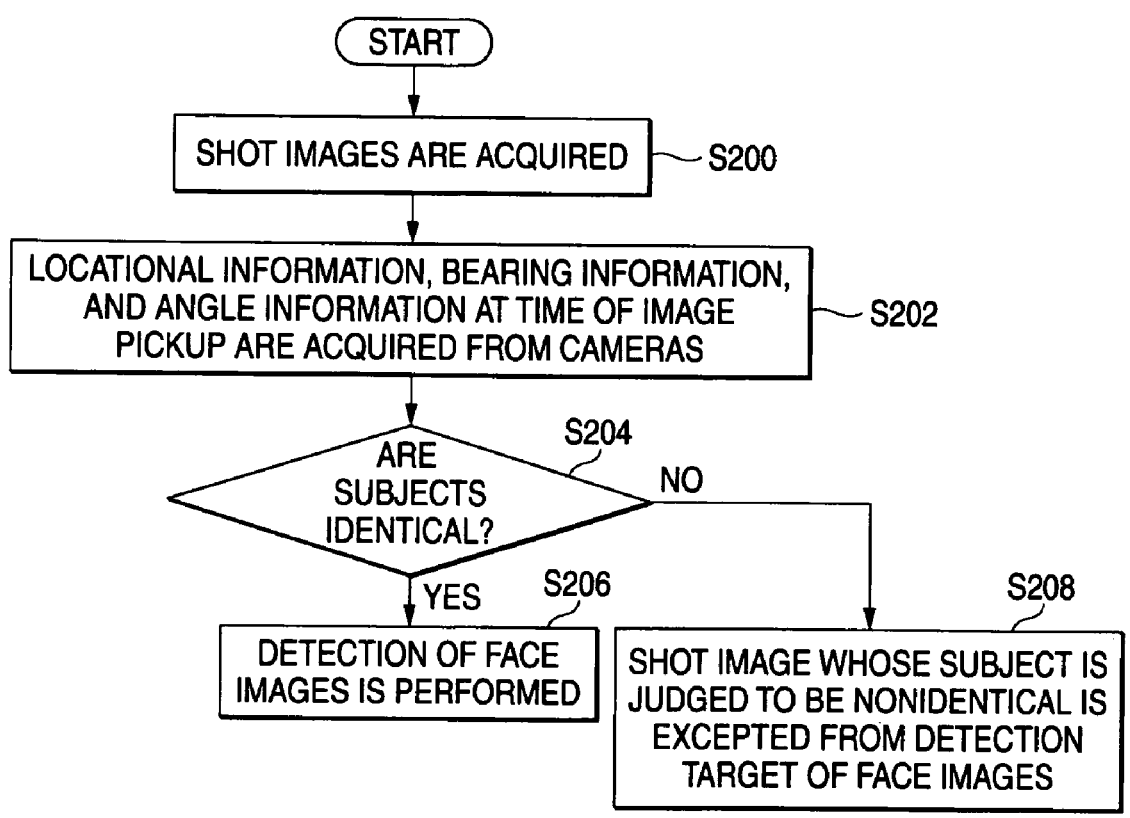
FIG. 9 is a flow chart showing the flow of information processing in the embodiment.

As described above, the information-processing device 102 makes the display device 106 display shot images taken at a common timing in the priority order. Also, the information-processing device 102 can perform the process of judging whether the subjects of shot images taken at a common timing are identical. FIG. 9 shows the flow of the process of judging the identity of the subject by the information-processing device 102.

As shown in FIG. 9, the information-processing device 102 first acquires shot images taken at a common timing (S200). Then, the information-processing device 102 acquires the locational information, image pickup bearing information and image pickup angle information at the time of image pickup from the cameras used to take the shot images (S202). After that, the information-processing device 102 judges whether or not the subjects targeted by the cameras are identical (S204). When it is judged that the subjects are identical, the information-processing device 102 advances the step of detecting a face image (S206). On the other hand, when it is judged at S204 that the subject of a certain shot image is different from the subject of other shot images, the different shot image is excepted from the detection target of face images (S208).

The flow of information processing in the case of assigning a higher priority to a shot image which satisfies the following conditions has been described above: more face images are detected from the shot images; the percentage of the detected face image in which the face is kept turned straight ahead is higher; the percentage of the detected face image whose size is large is higher; and the percentage of the detected face image located near the center of the shot image is higher. Next, the flow of information processing in the case of assigning a higher priority to a shot image which satisfies the following conditions in regard to a person whose face image is detected from shot images and identified by the face-recognizing process will be described with reference to FIGS. 12 and 13: the direction of the face of the person is more closely a direction in which the face is kept turned straight ahead; the face image of the person is larger; and the position of the face image is nearer to the center of the shot image.

The information-processing device 102 first acquires shot images taken at a common timing (S300). Then, the information-processing device 102 detects a face image from the acquired shot images (S302). Subsequently, the information-processing device 102 executes the process of face recognition on the detected face image (S304). Then, the information-processing device 102 determines an evaluation value based on the result of the detection of the face image of a person identified by the process of face recognition (S306).

Further, the information-processing device 102 performs the face detection, the face recognition, and the determination of evaluation values based on the results of detection of a face image of an identified person on all the acquired shot images (S308). After that, the information-processing device 102 determines the priority order based on evaluation values of the shot images concerning a particular person (S310).

Then, the information-processing device 102 makes the display device 106 display the shot images in the priority order (S312).

The above-described process allows the information-processing device 102 to display shot images taken at a common timing in the priority order with respect to a certain person. FIGS. 13A to 13E show examples of evaluation values assigned to the shot images by information-processing device 102 and an example of prioritization of the images based on the evaluation values.

Referring to FIG. 13A, there are exemplified a shot image A 402 and a shot image B 406 as two examples of shot images taken at a common timing. In the drawing, evaluation values with respect to registered users X and Y whose faces are recognized from among the shot images, which are determined based on the conditions of face images, are shown.

Face Angle 408 shows face angles of face images. In this example, the reference numerals of the discriminators shown in FIG. 7 are used as face angles as they are. Face Size 410 shows a kind of face image size, and is classified into Large, Middle and Small as in Face Size 314 in FIG. 10A. Face Position 412 shows a position of a face image in the whole shot image, and is classified into Center, Left, Right, Upper and Lower as in Face Position 316 in FIG. 10A.

In the examples shown in the drawing, face images of the registered users X and Y are detected from both the shot image A 402 and shot image B 406. As for a face image of the registered user X in the shot image A 402, it is seen that the face angle is Posture L4, the face size is Middle, and the position is located in the center of the shot image. On the other hand, as for a face image of the registered user X, the face angle is Posture L14, the size is Middle, and the position is a right end of the shot image in the shot image B 406. Further, as for a face image of the registered user Y in the shot image A 402, it is seen that the face angle is Posture L11, the size is Large, and the position is a left end of the shot image. On the other hand, as for a face image of the registered user Y in the shot image B 406, the face angle is Posture L15, the size is Large, and the position is the center of the shot image.

The points which the prioritizing part 218 uses for prioritization are shown in FIGS. 13B, 13C and 13D. FIG. 13B shows points concerning Face Angle 408, in which postures 414 are associated with points 416. FIG. 13C shows points concerning Face Size 410, in which face sizes 418 are associated with points 416. FIG. 13D shows points concerning Face Position 420, in which face positions 420 are associated with points 416. The prioritizing part 218 assigns a predetermined point with respect to an evaluation value determined by the image-evaluating part 210, adds up the points, and assigns higher priorities to shot images in descending order of total points.

Referring to FIG. 13E, there is shown an example in which the prioritizing part 218 adds up points of each shot image according to the individual registered users X and Y based on the information shown in FIG. 13A. The reference numeral 421 shows an example of calculation of points of the shot image A concerning the registered user X. The face angle of the registered user X in the shot image A 402 is L4 and as such, seven points is assigned with reference to FIG. 13B. Also, the face size of the registered user X in the shot image A 402 is Middle and as such, three points is assigned with reference to FIG. 13C. Further, the face position of the registered user X in the shot image A 402 is Center and as such, five points is assigned with reference to FIG. 13D. As a result, the total point of the shot image A 402 with respect to the registered user X is made 15 points. Likewise, when the total of points of the shot image B 406 with respect to the registered user X is determined, it is seven points. Therefore, the prioritizing part 218 assigns the first place to the shot image A 402 with respect to the registered user X, and assigns the second place to the shot image B406.

Also, the prioritizing part 218 determines points of the shot image A 402 and the shot image B 406 with respect to the registered user Y in the same way, and prioritizes the shot images based on the resultant points. As a result, the shot image A 402 is assigned 8 points with respect to the registered user Y, and the shot image B 406 is assigned 11 points. Therefore, the shot image B 406 is assigned the first place and the shot image A 402 is assigned the second place.

After the prioritizing part 218 prioritizes the shot images with respect to each person as described above, the shot images with respect to each person are displayed on the display device 106 in the priority order.

A camera system in association with the invention is applied to the camera system 100 as the first embodiment of the invention, and the camera system 100 has been described above. The camera system 100 uses two or more cameras to take images of a subject at a common timing, and displays the shot images on a display device according to what condition the subject in each of images taken by the two or more cameras comes out in. According to the camera system 100 in association with the embodiment, shot images taken at a common timing are prioritized based on the criteria including the number of detected face images, the face angle and size of a face image, and the position of a face image in a shot image. Then, the shot images are displayed on the display device in the priority order decided based on the prioritization. Therefore, the camera system 100 can automatically selects a shot image in which a subject comes out under a good condition from among shot images obtained when two or more cameras are used to take images of the same subject at a common timing and bring out the selected image to a user. Also, the camera system 100 can judge the identity of a target for image pickup by use of locational information, image pickup bearing information and tilt angle information of the cameras at the time of image pickup.

Second Embodiment

Here, a camera system in association with the invention is applied to a camera system such that two or more cameras are used to take images of the same subject at a common timing and the shot images taken by the cameras are displayed on a display device according to the positions of the cameras at the time of image pickup. Such camera system will be described as the second embodiment of the invention.

The general configuration of the camera system in association with the second embodiment and the hardware configuration of the information-processing device are the same as those in the first embodiment and as such, their descriptions are omitted. As for the functional configuration of the information-processing device, it is sufficient that the information-processing device includes: a synchronous shot image-acquiring part 202; a locational information-acquiring part 204; and a display control part 220, which are the same as those in the functional configuration of the information-processing device 102 in association with the first embodiment. Specifically, the display control part 220 makes the display device 106 display shot images, which the synchronous shot image-acquiring part 202 has acquired from the cameras, based on the locational information on the cameras acquired by the locational information-acquiring part 204, in which the shot images are displayed in a locational relation corresponding to the locational relation between the cameras.

Figure 14:
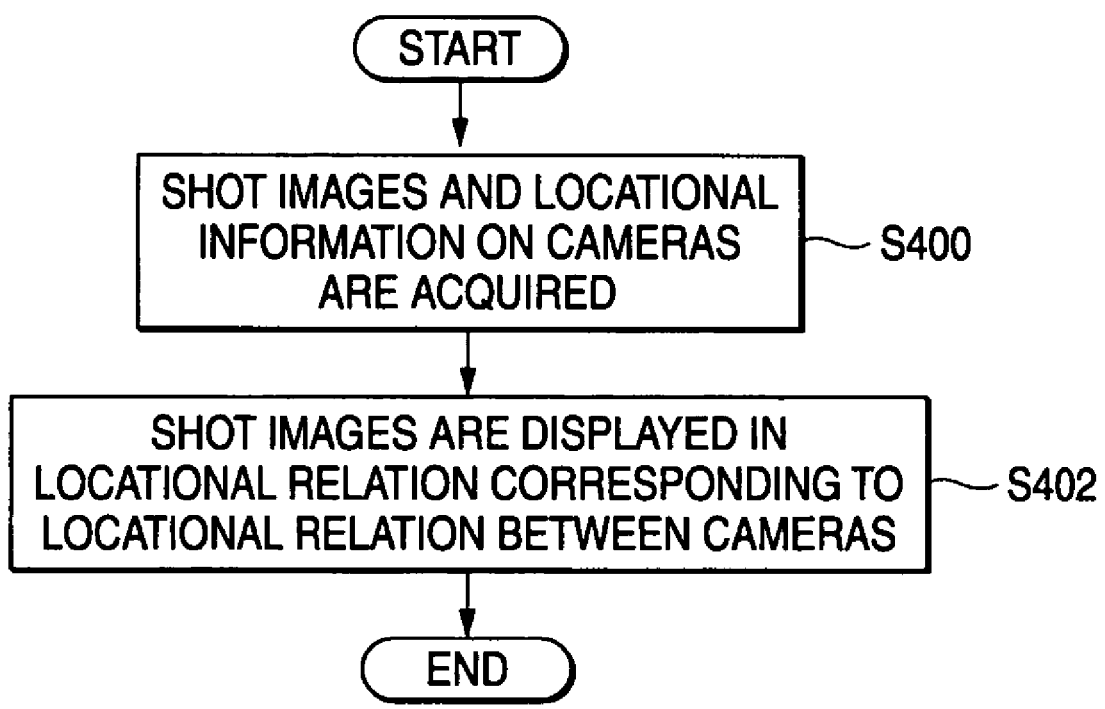
FIG. 14 is a flow chart showing the flow of information processing in association with the second embodiment of the invention.

Referring to FIG. 14, there is shown the flow of information processing that the information-processing device in association with the embodiment executes. As shown in FIG. 14, the information-processing device first acquires shot images taken at a common timing and the locational information of the cameras (S400). Then, the information-processing device makes the display device display the shot images in a locational relation corresponding to the locational relation between the cameras (S402).

Figure 15:
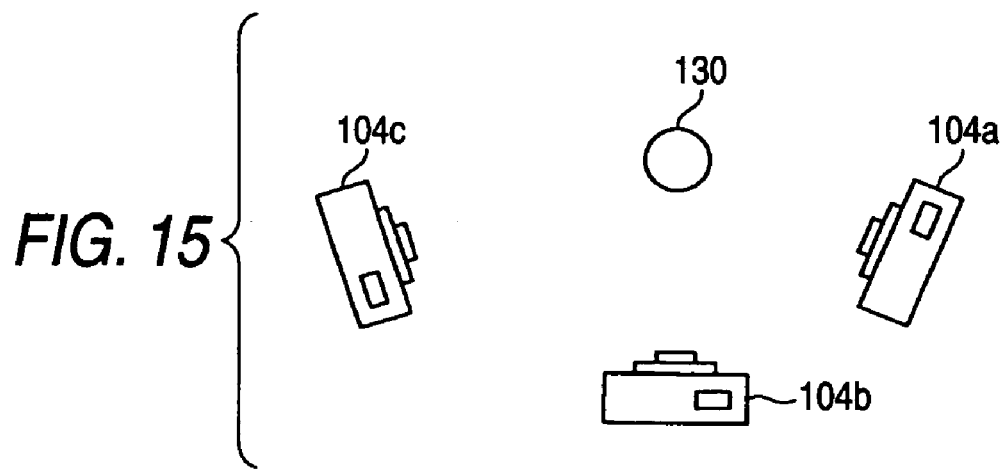
FIG. 15 is an illustration showing the arrangement of cameras at the time of image pickup in the embodiment.
Figure 16:
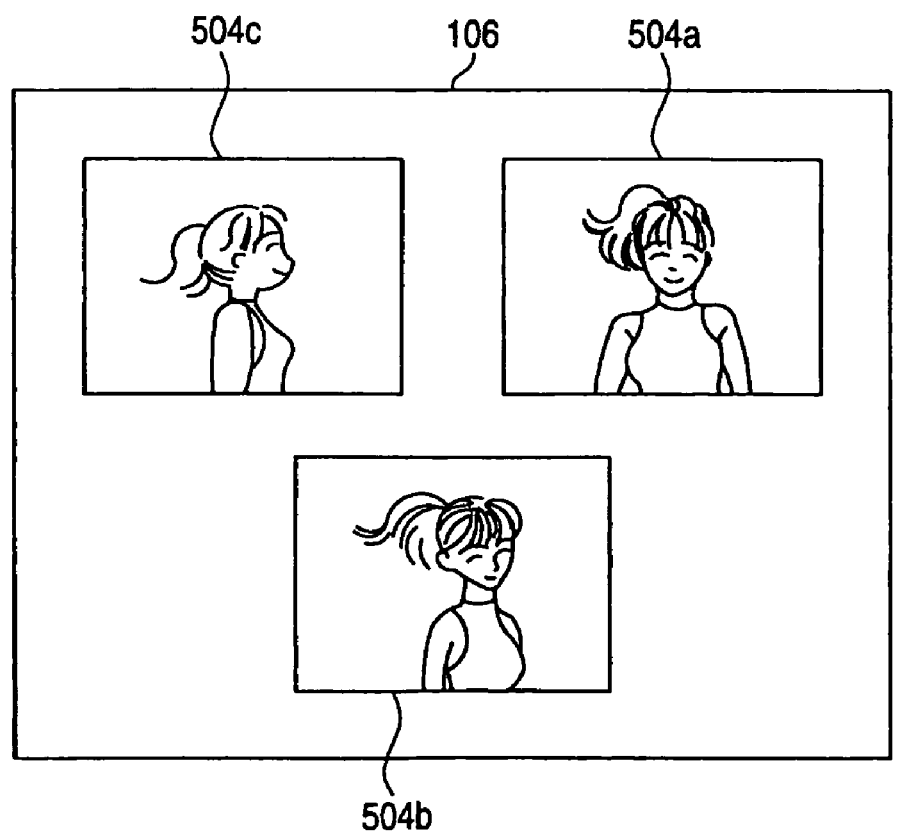
FIG. 16 is an illustration showing an example of display of shot images in the embodiment.

An example where shot images taken by the camera system in association with the embodiment are displayed on the display device is shown in FIGS. 15 and 16. As shown in FIG. 15, images of a subject 130 are taken by the cameras 104a, 104b, 104c at a common timing. The shot images taken by cameras are displayed on the display device 106, as shown in FIG. 16. In FIG. 16, the shot image 504c is a shot image taken by the camera 104c, the shot image 504b is a shot image taken by the camera 104b, and the shot image 504a is a shot image taken by the camera 104a. As shown in FIG. 15, the camera 104a and camera 104c are disposed with the camera 104b placed therebetween. The shot images 504a, 504b and 504c are displayed on the display device 106 so as to locationally correspond to the locational relations between the cameras specifically, the shot image 504b taken by the camera 104b is disposed in the center in a horizontal direction of the screen of the display device, and the shot images 504c and 504a are disposed so that they sandwich the shot image 504b therebetween in the horizontal direction.

As described above, the camera system in association with this embodiment can display shot images in a locational relation corresponding to the locational relation between the cameras.

Because the shot images are displayed in the locational relation corresponding to the locational relation between the cameras, a user can grasp the locational relation between the cameras at the time of taking the shot images at a glance.

Third Embodiment

Now, a camera system in association with the invention is applied to a camera system such that two or more cameras are used to take images of the same subject at a common timing and a person identified by face images detected from at least one of the shot images taken by the cameras is associated to all the shot images taken at the common timing. Such camera system will be described as the third embodiment of the invention.

The general configuration of the camera system in association with the third embodiment and the hardware configuration of the information-processing device are the same as those in the first embodiment and as such, their descriptions are omitted. As for the functional configuration of the information-processing device, it is sufficient that the information-processing device includes: a synchronous shot image-acquiring part 202; an image-evaluating part 210; a face-recognizing part 214; a personage-memorizing part 212; a locational information-acquiring part 204; an image pickup bearing-acquiring part 206; an image pickup angle-acquiring part 208; and a display control part 220, which are the same as those in the functional configuration of the information-processing device 102 in association with the first embodiment.

Specifically, the image-evaluating part 210 detects face images from shot images, which the synchronous shot image-acquiring part 202 has acquired from the cameras, and the face-recognizing part 214 carries out a recognizing operation on the detected face images thereby to identify a person. Then, an identifier (e.g. name) of the identified person is associated with the shot images acquired by the synchronous shot image-acquiring part 202 to store them in the personage-memorizing part 212. Further, the identity-of-subject judging part 216 judges the identity of the subject based on the information acquired by the locational information-acquiring part 204, the image pickup bearing-acquiring part 206 and the image pickup angle-acquiring part 208. The shot image whose subject is judged to be nonidentical with the subject of other shot images may be excepted from the personage-memorizing part 212. Then, the display control part 220 makes the display device 106 display a shot image memorized in the personage-memorizing part 212.

Figure 17:
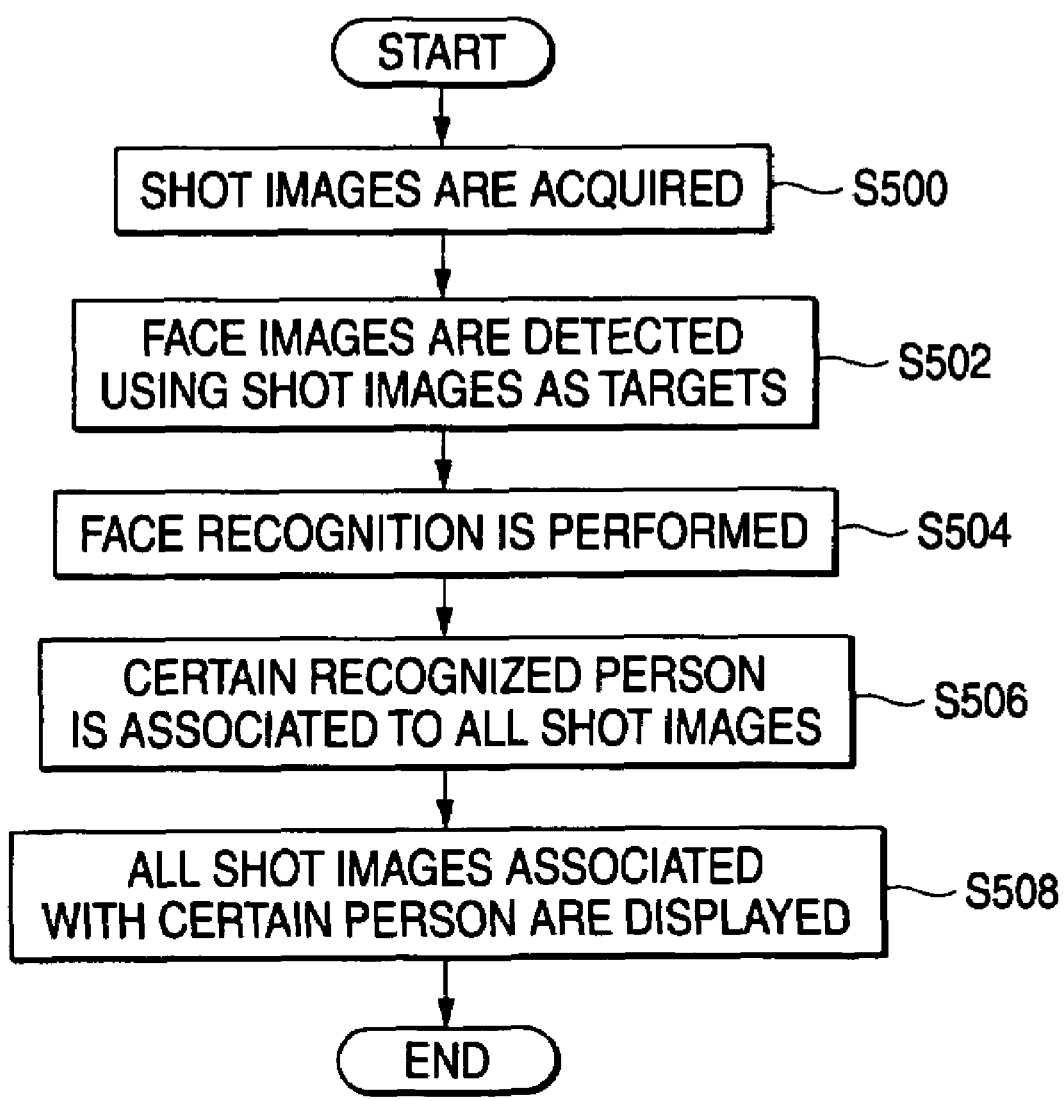
FIG. 17 is a flow chart showing the flow of information processing in association with the third embodiment of the invention.

Referring to FIG. 17, there is shown the flow of information processing that the information-processing device in association with the embodiment executes. As shown in FIG. 17, the information-processing device first acquires shot images taken at a common timing (S500). Next, the information-processing device detects face images using the acquired shot images as targets (S502) to perform face recognition using the detected face images as targets (S504). Then, the information-processing device associates an identifier of a person identified by the face recognition at S504 with all the shot images which have been acquired at S500 (S506). After that, the information-processing device makes the display device 106 display all the shot images associated with the certain person at S506. Otherwise, the information-processing device may allow a user to download all the shot images associated with the certain person at S506 in accordance with a person's request in response to a request from the user.

As described above, the camera system in association with this embodiment can display shot images associated with a certain person. Therefore, a user can display and download all the images in which the user comes out.

The preferred embodiments of the invention have been described above with reference to the accompanying drawings. However, it is needless to say that the invention is not limited to the examples in association with the embodiments. It should be obvious that those skilled in the art can devise various changes or modifications within a scope stated in Claims. It should be understood, of course, that those changes and modifications also belong to a technical scope of the invention.

For example, in the above embodiments, two or more cameras mutually communicate by wireless communication, thereby to take images at a common timing. However, the invention is not limited to the such example. For example, a user who pushes a button of each camera may synchronize the push timings of the cameras to push the buttons, thereby to make the cameras take images at a common timing.

Further, while in the above embodiments the image-evaluating part 210 determines the evaluation value based on the condition of a face image included in a shot image, the invention is not limited to such example. For example, the evaluation value may be determined based on a shot image condition resulting from the camera shake at the time of image pickup, the brightness of a shot image, etc.

In addition, while in the embodiments, the image-evaluating part 210 is provided in the information-processing device 102, the invention is not limited to such example. For example, the image-evaluating part 210 may be provided on the side of the camera.

What is claimed is:

1. A camera system, comprising:
   a plurality of cameras;
   an information-processing device, which is connected through a communication network with the plurality of cameras, and which acquires a shot image from each of the plurality of cameras,
   wherein the plurality of cameras each includes:
   an image-pickup part operable to take an image of a subject, and
   an image-pickup synchronizing part operable to mutually synchronize an image-pickup timing of one of the cameras with an image-pickup timing of another one of the cameras, and
   wherein the information-processing device includes:
   a synchronous shot image-acquiring part operable to acquire the shot image taken by each of the cameras at a common timing from the cameras,
   an image-evaluating part operable to evaluate a condition of a subject in each of the acquired shot images based on predetermined evaluation criteria and to assign an evaluation value to each of the acquired shot images,
   a prioritizing part operable to assign a priority to each of the shot images according to the evaluation value assigned to each shot image by the image-evaluating part, and
   a display control part operable to make a display device display the shot images according to the priorities assigned to the shot images by the prioritizing part.

2. An information-processing device, which is connected through a communication network with a plurality of cameras each operable to synchronize an image pickup timing thereof with an image-pickup timing of another one of the cameras and take an image of a subject, and wherein the information-processing device is configured to acquire a shot image from each of the cameras, the information-processing device comprising:
   a synchronous shot image-acquiring part operable to acquire the shot image taken by each of the cameras at a common timing from the cameras;
   an image-evaluating part operable to evaluate a condition of subject in each of the acquired shot images image concerning each of the shot images taken at a common timing acquired by the synchronous shot image acquiring part based on predetermined evaluation criteria and to assign an evaluation value to each of the acquired shot images;
   a prioritizing part operable to assign a priority to each of the shot images according to the evaluation value assigned to each shot image by the image-evaluating part; and
   a display control part operable to make a display device display the shot images according to the priorities assigned to the shot images by the prioritizing part.

3. The information-processing device of claim 2, wherein the image-evaluating part detects a face image of a person from each of the shot images, and determines the evaluation value of each of the shot images based on a condition of the detected face image.

4. The information-processing device of claim 3, wherein the image-evaluating part determines the evaluation value of each of the shot images based on a face angle of the detected face image, and
   the prioritizing part assigns a higher priority to a shot image of an image of a fullface of the person in comparison to a shot image of a face at an angle other than the fullface of the person based on the evaluation values.

5. The information-processing device of claim 3, wherein the image-evaluating part determines the evaluation value of each of the shot images based on a size of the detected face image, and
   the prioritizing part assigns, based on the evaluation values, a higher priority to a shot image with a face image that has a size of a predetermined value or larger in comparison to a shot image whose with a face image that has a size below the predetermined value.

6. The information-processing device of claim 3, wherein the image-evaluating part determines the evaluation value of each of the shot images based on locational information on the detected face image in the shot images, and
   the prioritizing part assigns, based on the evaluation values, a higher priority to a first shot image with a face image that is located at a distance shorter than a predetermined distance from a center of the first shot image in comparison to a second shot image with a face image that is located at a distance longer than the predetermined distance from the center of the second shot image.

7. The information-processing device of claim 3, wherein the image-evaluating part determines the evaluation value of each of the shot images based on a number of face images detected from the shot images, and
   the prioritizing part assigns a higher priority to the shot images that include a larger number of detected face images, based on the evaluation values.

8. The information-processing device of claim 3, wherein the image-evaluating part determines the evaluation value of each of the shot images based on a number of face images detected from each shot image, and a face angle of the at least one detected face image, and
   the prioritizing part assigns a higher priority to the shot images that include a larger number of the detected face images that are fullface images, based on the evaluation values.

9. The information-processing device of claim 3, further comprising a face-recognizing part operable to identify a person appropriate for the face image based on the detected face image,
   wherein the image-evaluating part determines the evaluation value of each shot image based on a condition of the face image of the person identified by the face-recognizing part.

10. The information-processing device of claim 3, further comprising: a face-recognizing part operable to identify a person appropriate for the face image based on the detected face image; and
    a personage-memorizing part operable to associate and memorize information of the person identified by the face-recognizing part from at least one of the shot images acquired by the synchronous shot image-acquiring part with all the shot images.

11. The information-processing device of claim 2, further comprising a locational information-acquiring part operable to acquire image pickup locational information showing a position of each camera at the time of image pickup of the subject from the cameras.

12. The information-processing device of claim 11, further comprising an image pickup bearing-acquiring part operable to acquire image pickup bearing information showing an image pickup bearing of each camera at the time of image pickup of the subject from at least one of the cameras.

13. The information-processing device of claim 11, further comprising an image pickup angle-acquiring part operable to acquire image pickup angle information showing a tilt angle of each camera at the time of image pickup of the subject from at least one of the cameras.

14. The information-processing device of claim 2, wherein the display control part makes the display device display the shot images in turn in a priority order of the shot images.

15. The information-processing device of claim 2, wherein the display control part makes the display device display the shot images in a priority order of the shot images with their image size changed.

16. An information processing method executed by an information-processing device, which is connected through a communication network with a plurality of cameras each operable to synchronize an image pickup timing thereof with an image-pickup timing of another one of the cameras and take an image of a subject, and which acquires a shot image from each of the cameras, the method comprising:

acquiring shot images taken by the plurality of cameras at a common timing from the cameras;
  evaluating a condition of a subject in each of the acquired shot images based on predetermined evaluation criteria;
  assigning an evaluation value to each shot image;
  assigning a priority to each of the shot images according to the evaluation value assigned to each shot image; and
  making a display device display the shot images according to the priorities assigned to the shot images.

17. A camera, which is connected through a communication network with an information-processing device operable to make a display device display an image, and wherein the camera is configured to send a shot image to the information-processing device, the camera comprising:

an image-pickup part operable to take an image of a subject;
  an image-pickup synchronizing part operable to synchronize an image-pickup timing of the camera with an image-pickup timing of another camera;
  an image-evaluating part operable to evaluate a condition of a subject in the shot image based on predetermined evaluation criteria and to assign an evaluation value to the shot image; and
  a shot image sending part operable to associate and send the shot image with the evaluation value to the information-processing device.

18. The camera of claim 17, wherein the image-evaluating part detects a face image of a person from the shot image, and determines the evaluation value of the shot image based on a condition of the detected face image.

* * * * *